(12) United States Patent
Yamanishi et al.

(10) Patent No.: US 9,935,488 B2
(45) Date of Patent: Apr. 3, 2018

(54) PORTABLE TERMINAL CHARGING APPARATUS AND AUTOMOBILE HAVING PORTABLE TERMINAL CHARGING APPARATUS MOUNTED THEREIN

(71) Applicant: Panasonic Intellectual Property Management Co., Ltd., Osaka (JP)

(72) Inventors: Yuto Yamanishi, Kanagawa (JP); Ken Hatakeyama, Kanagawa (JP); Tomohiro Ota, Hyogo (JP); Takeshi Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 87 days.

(21) Appl. No.: 15/106,627

(22) PCT Filed: Dec. 16, 2014

(86) PCT No.: PCT/JP2014/006256
§ 371 (c)(1),
(2) Date: Jun. 20, 2016

(87) PCT Pub. No.: WO2015/098038
PCT Pub. Date: Jul. 2, 2015

(65) Prior Publication Data
US 2017/0005505 A1 Jan. 5, 2017

(30) Foreign Application Priority Data
Dec. 25, 2013 (JP) .................................. 2013-266810

(51) Int. Cl.
*H02J 7/02* (2016.01)
*H02J 50/80* (2016.01)
(Continued)

(52) U.S. Cl.
CPC .............. *H02J 7/025* (2013.01); *H02J 7/027* (2013.01); *H02J 7/1461* (2013.01); *H02J 50/12* (2016.02);
(Continued)

(58) Field of Classification Search
CPC .......... H02J 7/025; H02J 7/027; H02J 7/1461; H02J 50/80; H02J 50/90; H02J 50/12
(Continued)

(56) References Cited

U.S. PATENT DOCUMENTS
8,305,036 B2    11/2012    Toya et al.
9,819,232 B2 *  11/2017    Patino ..................... H02J 50/70
(Continued)

FOREIGN PATENT DOCUMENTS
EP          3065262         9/2016
JP       2009-247194       10/2009
(Continued)

OTHER PUBLICATIONS
Extended European Search Report dated Jan. 5, 2017 in corresponding European Patent Application No. 14874692.8.
(Continued)

Primary Examiner — Stacy Whitmore
(74) Attorney, Agent, or Firm — Wenderoth, Lind & Ponack, L.L.P.

(57) ABSTRACT

A charging coil of a portable terminal charging apparatus is provided with a first detection coil, and a second detection coil disposed inward of the first detection coil and having a smaller diameter than a diameter of the first detection coil. The first and second detection coils are connected to a controller. If the ratio (V2/V1) of a second voltage (V2) detected by the second detection coil to a first voltage (V1) detected by the first detection coil is less than a first set value held in a memory between starting of conduction of the charging coil and connection of a charging load of the portable terminal, the controller performs a safety operation.

21 Claims, 16 Drawing Sheets

(51) Int. Cl.
  *H02J 50/12* (2016.01)
  *H02J 50/90* (2016.01)
  *H02J 50/60* (2016.01)
  *H02J 7/14* (2006.01)
  *H02J 7/00* (2006.01)

(52) U.S. Cl.
  CPC .............. *H02J 50/60* (2016.02); *H02J 50/80* (2016.02); *H02J 50/90* (2016.02); *H02J 7/0042* (2013.01); *H02J 2007/0001* (2013.01)

(58) Field of Classification Search
  USPC .................................................. 320/107–108
  See application file for complete search history.

(56) References Cited

U.S. PATENT DOCUMENTS

| | | | |
|---|---|---|---|
| 2010/0315038 A1* | 12/2010 | Terao | H01F 38/14 320/108 |
| 2013/0099592 A1 | 4/2013 | Abe | |
| 2013/0169062 A1 | 7/2013 | Maikawa et al. | |
| 2013/0241300 A1 | 9/2013 | Miyamoto | |
| 2015/0198640 A1* | 7/2015 | Lee | H02J 7/025 320/108 |
| 2015/0229156 A1* | 8/2015 | Iwabuchi | B60L 11/182 320/108 |
| 2016/0181875 A1* | 6/2016 | Long | H02J 50/90 320/108 |
| 2016/0336791 A1* | 11/2016 | Na | H02J 7/025 |
| 2017/0047777 A1* | 2/2017 | Nakano | H02J 5/005 |
| 2017/0187355 A1* | 6/2017 | Yang | H03J 7/04 |

FOREIGN PATENT DOCUMENTS

| | | |
|---|---|---|
| JP | 2012-016125 | 1/2012 |
| JP | 2013-192391 | 9/2013 |
| WO | 2012/165244 | 12/2012 |

OTHER PUBLICATIONS

International Search Report of PCT application No. PCT/JP2014/006256 dated Feb. 24, 2015.

* cited by examiner

Magnetic flux line caused by charging coil

Magnetic flux line caused by eddy current

Change in roughness and fineness of magnetic flux density

Magnetic flux line caused by eddy current

Change in roughness and fineness of magnetic flux density

PORTABLE TERMINAL CHARGING APPARATUS AND AUTOMOBILE HAVING PORTABLE TERMINAL CHARGING APPARATUS MOUNTED THEREIN

1. FIELD OF THE INVENTION

The present invention relates to a portable terminal charging apparatus used to charge a portable terminal such as a mobile phone, and an automobile having the portable terminal charging apparatus mounted therein.

2. DESCRIPTION OF THE RELATED ART

Functions of a portable terminal such as a mobile phone have been considerably advanced, and thus power consumption thereof has also been increased.

Therefore, charging the portable terminal is required to be performed at any locations including the inside of an automobile, but, as a trend in recent years, a mobile terminal charging apparatus which can perform so-called noncontact charging without using a cable has attracted attention.

In other words, the portable terminal charging apparatus includes a support plate whose surface side serves as a portable terminal placement portion, and a charging coil provided to oppose a rear surface side of the support plate. If a portable terminal is placed on the portable terminal placement portion, the portable terminal can be charged by using magnetic fluxes from the charging coil (for example, the following PTLs 1 and 2 disclose techniques similar thereto).

CITATION LIST

Patent Literature

PTL 1: Japanese Patent Unexamined Publication No. 2012-16125
PTL 2: Japanese Patent Unexamined Publication No. 2009-247194

SUMMARY OF INVENTION

The present invention provides a portable terminal charging apparatus which is convenient to use. According to one aspect of the present invention, there is provided a portable terminal charging apparatus including a support plate whose front surface side is used as a portable terminal placement portion; a charging coil that charges a portable terminal placed on the portable terminal placement portion; a controller that is connected to the charging coil; and a memory that is connected to the controller. The charging coil is provided with a first detection coil, and a second detection coil disposed inward of the first detection coil and having a smaller diameter than a diameter of the first detection coil, and the first and second detection coils are connected to the controller. If the ratio (V2/V1) of a second voltage (V2) detected by the second detection coil to a first voltage (V1) detected by the first detection coil is less than a first set value held in the memory between starting of conduction of the charging coil and connection of a charging load of the portable terminal, the controller performs a safety operation.

With the above-described configuration, it is possible to reliably detect a foreign object even in a case where portable terminals of different models are charged. As a result, various types of portable terminals can be charged, and thus convenience is improved.

Generally, during connection of a charging load of a portable terminal, a state occurs in which the charging load (for example, a charging battery or a display) is connected to a terminal charging coil of the portable terminal. In this state, a value of a current flowing through the charging coil of the portable terminal charging apparatus also greatly differs or greatly changes depending on the model of portable terminal placed on the portable terminal placement portion of the support plate.

Therefore, if a foreign substance is detected in this state, there is a concern that the portable terminal may be wrongly detected as a foreign object depending on the model of portable terminal.

However, in the above-described configuration, even if models of portable terminals to be charged are different from each other, a value of a current flowing through the charging coil of the portable terminal charging apparatus does not greatly differ or does not greatly change depending on the model of portable terminal. As a result, it is possible to reliably detect a foreign object.

DETAILED DESCRIPTION OF THE PREFERRED EMBODIMENTS

Prior to description of an exemplary embodiment of the present invention, problems of the above-described example of the related art will be described. In the example of the related art, in a case where, for example, a metal foreign object such as a coin is placed on the portable terminal placement portion of the support plate, and a portable terminal is further placed thereon, the metal foreign object is detected by foreign object detection means, and, for example, conduction of the charging coil is blocked. Therefore, it is possible to prevent the temperature of the foreign object from increasing due to magnetic fluxes from the charging coil.

However, in the example of the related art, the foreign object detection means is constituted of a metal detection antenna coil and an oscillation circuit connected thereto, and thus is not preferable in terms of versatility.

In other words, in the example of the related art, if there is a metal foreign object, the foreign object is detected by using a change in an oscillation state of the oscillation circuit. In such a configuration, the oscillation circuit is extremely delicately set, and thus the configuration is useful for charging a portable terminal whose characteristics are known in advance. However, in a case where a portable terminal whose characteristics are not known is charged, an oscillation state is changed by the portable terminal, and, as a result, there is a portable terminal which cannot be charged, and thus the configuration is not preferable in terms of versatility.

For example, in a case where the portable terminal charging apparatus is provided in a vehicle interior of an automobile, an unspecified large number of people frequently try to charge various types of portable terminals. In this state, portable terminals cannot be charged depending on models of the portable terminals, and thus the portable terminal charging apparatus is inconvenient.

Hereinafter, with reference to the accompanying drawings, a description will be made of an example in which a portable terminal charging apparatus according to an exemplary embodiment of the present invention is equipped in an automobile.

Figure 1:
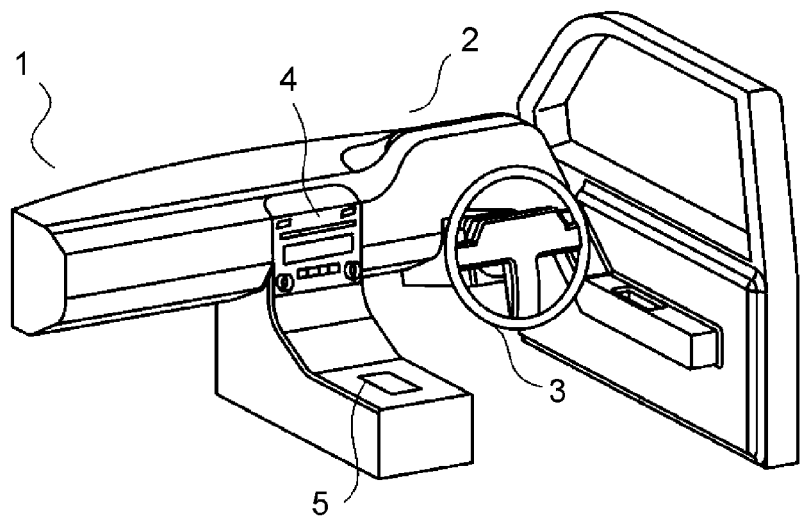
FIG. 1 is a perspective view illustrating a state in which a portable terminal charging apparatus according to an exemplary embodiment of the present invention is provided inside an automobile.

In FIG. 1, steering wheel 3 is provided on the front side in vehicle interior 2 of automobile 1. Electronic apparatus 4 which reproduces music or videos and displays car navigation images and the like is provided on the lateral side of steering wheel 3.

Portable terminal charging apparatus 5 is provided on the rear side of electronic apparatus 4 in vehicle interior 2.

Portable terminal charging apparatus 5 includes, as illustrated in FIGS. 2 to 8, box-shaped main body case 7 in which support plate 6 is disposed on an upper surface thereof; charging coil 8 provided to be moved in a horizontal direction in a state of opposing a lower surface side of support plate 6 in main body case 7; driver 9 which causes charging coil 8 to be moved in the horizontal direction so as to oppose the lower surface side of support plate 6; and a controller (the reference numeral 10 in FIG. 9) connected to driver 9 and charging coil 8.

Hereinafter, each constituent element will be described in detail. First, support plate 6 will be described.

Figure 6:
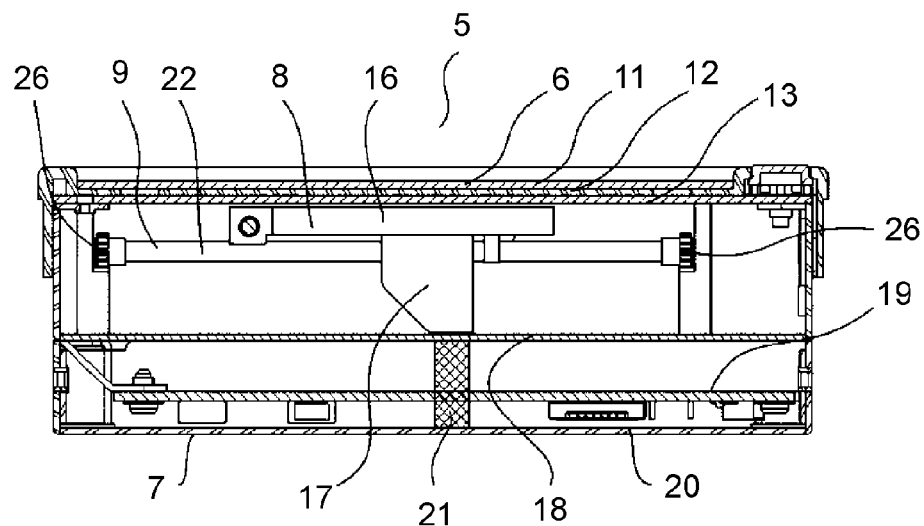
FIG. 6 is a sectional view taken along a dashed line S-S' in the portable terminal charging apparatus illustrated in FIG. 2.

As illustrated in FIG. 6, support plate 6 has a configuration in which front surface plate 11, intermediate plate 12, and rear surface plate 13 overlap each other. Front surface plate 11 and rear surface plate 13 are made of synthetic resin, and intermediate plate 12 is made of ceramics. In other words, a magnetic flux from charging coil 8 can pass through support plate 6 toward portable terminal 15.

Figure 10:
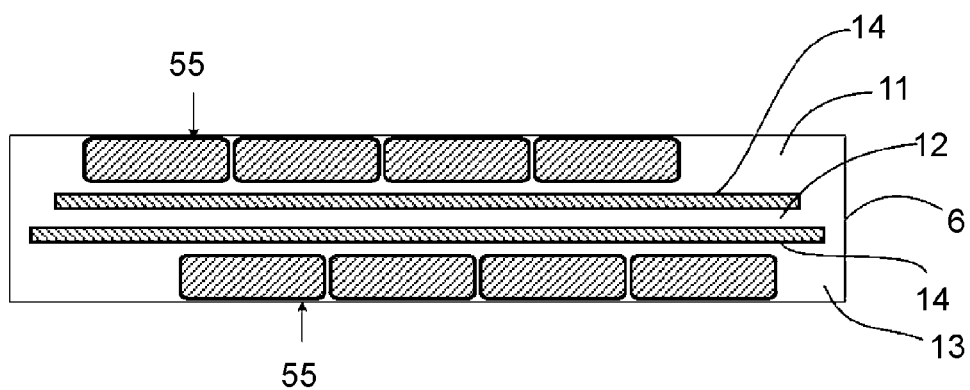
FIG. 10 is a sectional view illustrating a configuration of a support plate of the portable terminal charging apparatus illustrated in FIG. 2.
Figure 11:
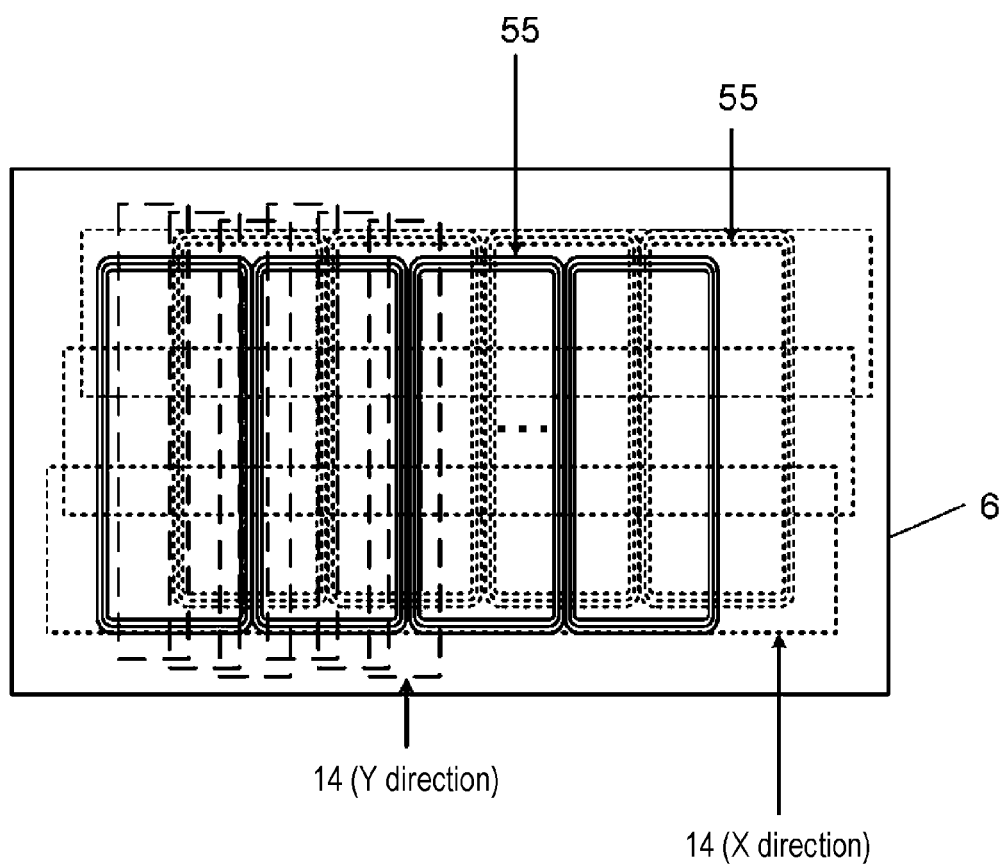
FIG. 11 is a plan view illustrating a configuration of the support plate of the portable terminal charging apparatus illustrated in FIG. 2.

Position detection coil 14 (an example of a charging coil position detector) illustrated in FIGS. 10 and 11 is provided in the Y direction and the X direction on front and rear surfaces of intermediate plate 12.

Position detection coil 14 is also used in, for example, PTL 2. Position detection coil 14 detects at which position portable terminal 15 is placed on the portable terminal placement portion which is the upper surface of support plate 6 as illustrated in FIG. 3.

Figure 3:
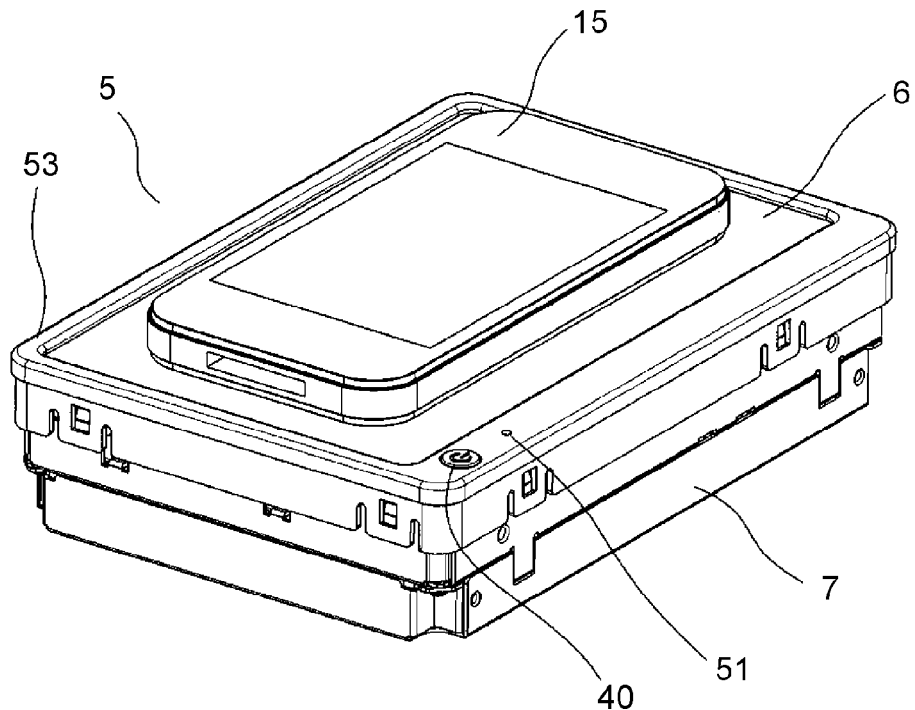
FIG. 3 is a perspective view illustrating a state in which a portable terminal is placed on the portable terminal charging apparatus illustrated in FIG. 2.

In the present exemplary embodiment, position detection coil 14 detects at which position portable terminal 15 is placed on the upper surface of support plate 6 as illustrated in FIG. 3. Next, driver 9 moves charging coil 8 to a position opposing a terminal charging coil (the reference numeral 15a in FIG. 14) of portable terminal 15.

Four foreign object detection coils 55 are disposed in a state of being close to each other in the Y direction on a front surface side (upper surface side) of front surface plate 11. Four foreign object detection coils 55 are disposed in a state of being close to each other in the Y direction on a rear surface side (lower surface side) of rear surface plate 13.

In the present exemplary embodiment, foreign object detection coils 55 detect whether or not there is a foreign object on the front surface (upper surface side) of front surface plate 11 during non-conduction of charging coil 8. This will be described in detail in the following description of an operation thereof.

Figure 4:
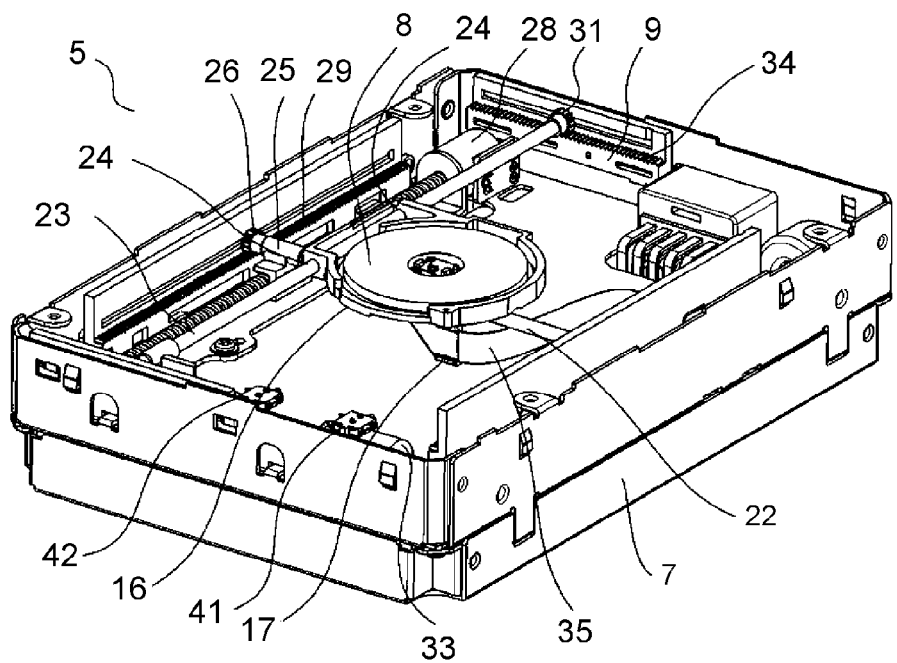
FIG. 4 is a perspective view illustrating a state in which a part of the portable terminal charging apparatus illustrated in FIG. 2 is omitted.
Figure 5:
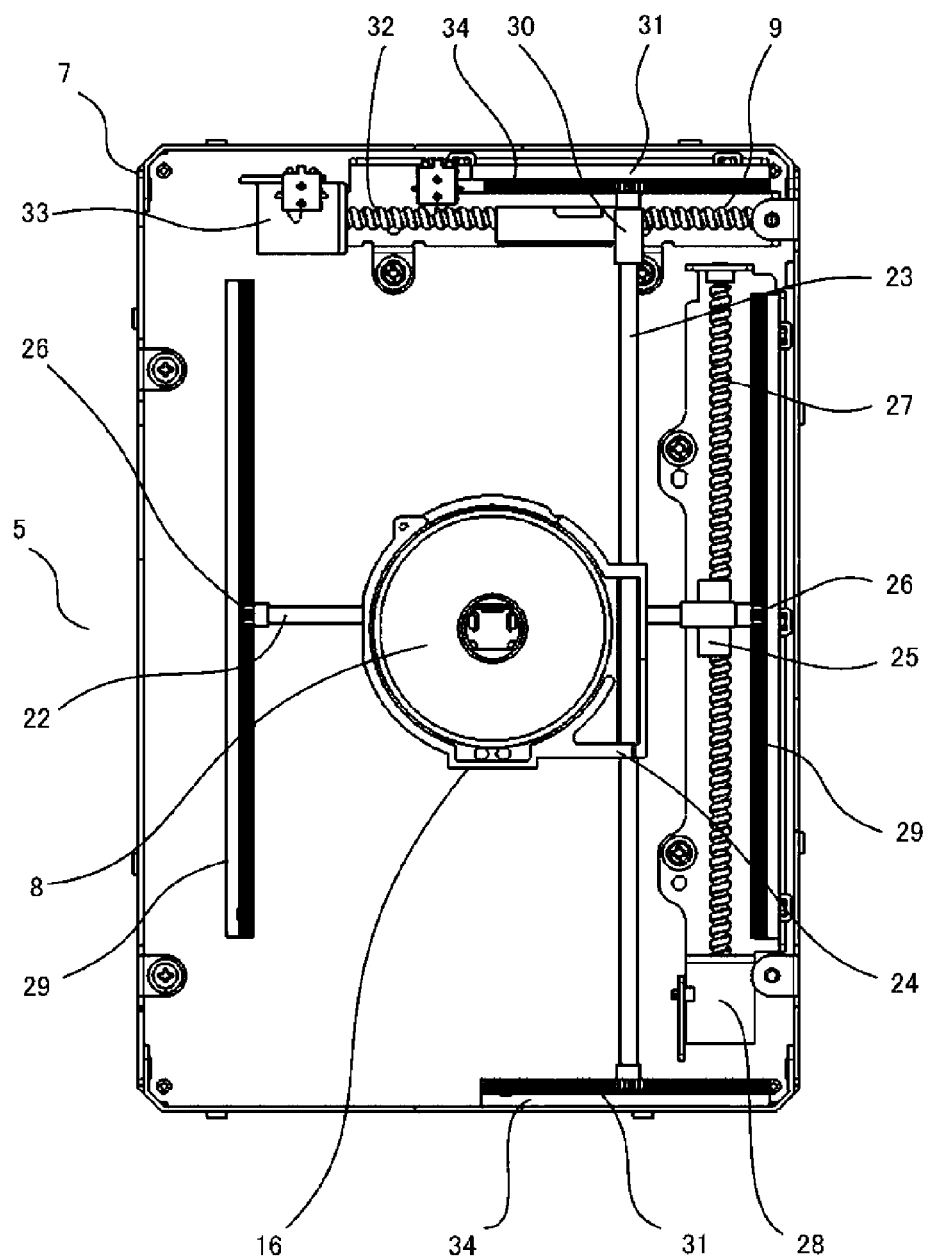
FIG. 5 is a plan view illustrating the portable terminal charging apparatus in the state illustrated in FIG. 4.

Next, charging coil 8 will be described. As illustrated in FIGS. 4 and 5, charging coil 8 has a ring shape formed by winding a wiring material in a spiral shape. An outer circumferential side and a lower surface side of the charging coil are held in a state of being covered with holding member 16 made of synthetic resin.

Support leg 17 extending toward a lower side of charging coil 8 is integrally formed with holding member 16 on its lower surface by using synthetic resin as illustrated in FIG. 6.

A gap of 0.3 millimeters is provided between a lower surface of support leg 17 and an upper surface of metallic support plate 18 disposed under support leg 17. Therefore, in a normal state, the lower surface of support leg 17 is not in contact with the upper surface of support plate 18 during movement of charging coil 8.

Control board 19 and a lower plate 20 of main body case 7 are disposed under support plate 18. Support member 21 penetrating through control board 19 is provided between a lower surface of support plate 18 and an upper surface of lower plate 20. In other words, in the present exemplary embodiment, the lower surface side of support plate 18 is supported by lower plate 20 of main body case 7 via support member 21 in order to increase the strength relative to excessive weight.

Next, driver 9 will be described. As illustrated in FIGS. 4 and 5, driver 9 includes X-axis direction driving shaft 22 and Y-axis direction driving shaft 23. An intermediate portion of each of X-axis direction driving shaft 22 and Y-axis direction driving shaft 23 is engaged with the holding member 16 in portions other than a portion of holding member 16 holding the charging coil.

In other words, a penetration hole (not illustrated) through which X-axis direction driving shaft 22 penetrates and penetration hole 24 through which Y-axis direction driving shaft 23 penetrates are provided in holding member 16 with a predetermined gap in the vertical direction in a state of crossing each other. X-axis direction driving shaft 22 and Y-axis direction driving shaft 23 penetrate through the penetration hole so as to be engaged with each other.

Worm wheel 25 is provided at one end side of X-axis direction driving shaft 22, gear 26 is provided at one end side thereof, and gear 26 is also provided at the other end side thereof. Worm wheel 25 is engaged with worm 27, and worm 27 is connected to motor 28. Gears 26 on both sides are respectively engaged with gear plates 29.

Therefore, if motor 28 is driven, worm 27 is rotated, and thus worm wheel 25 is moved in the X axis direction along with X-axis direction driving shaft 22. Therefore, charging coil 8 is moved in the X axis direction.

Worm wheel 30 is provided at one end side of Y-axis direction driving shaft 23, gear 31 is provided at one end side thereof, and gear 31 is also provided at the other end side thereof. Worm wheel 30 is engaged with worm 32, and worm 32 is connected to motor 33. Gears 31 on both sides are respectively engaged with gear plates 34.

Therefore, if motor 33 is driven, worm 32 is rotated, and thus worm wheel 30 is moved in the Y axis direction along with Y-axis direction driving shaft 23. Therefore, charging coil 8 is moved in the Y axis direction.

Flexible wiring 35 illustrated in FIG. 4 causes a current to flow through charging coil 8. An end of flexible wiring 35 is fixed to the side surface of above-described support leg 17.

Figure 9:
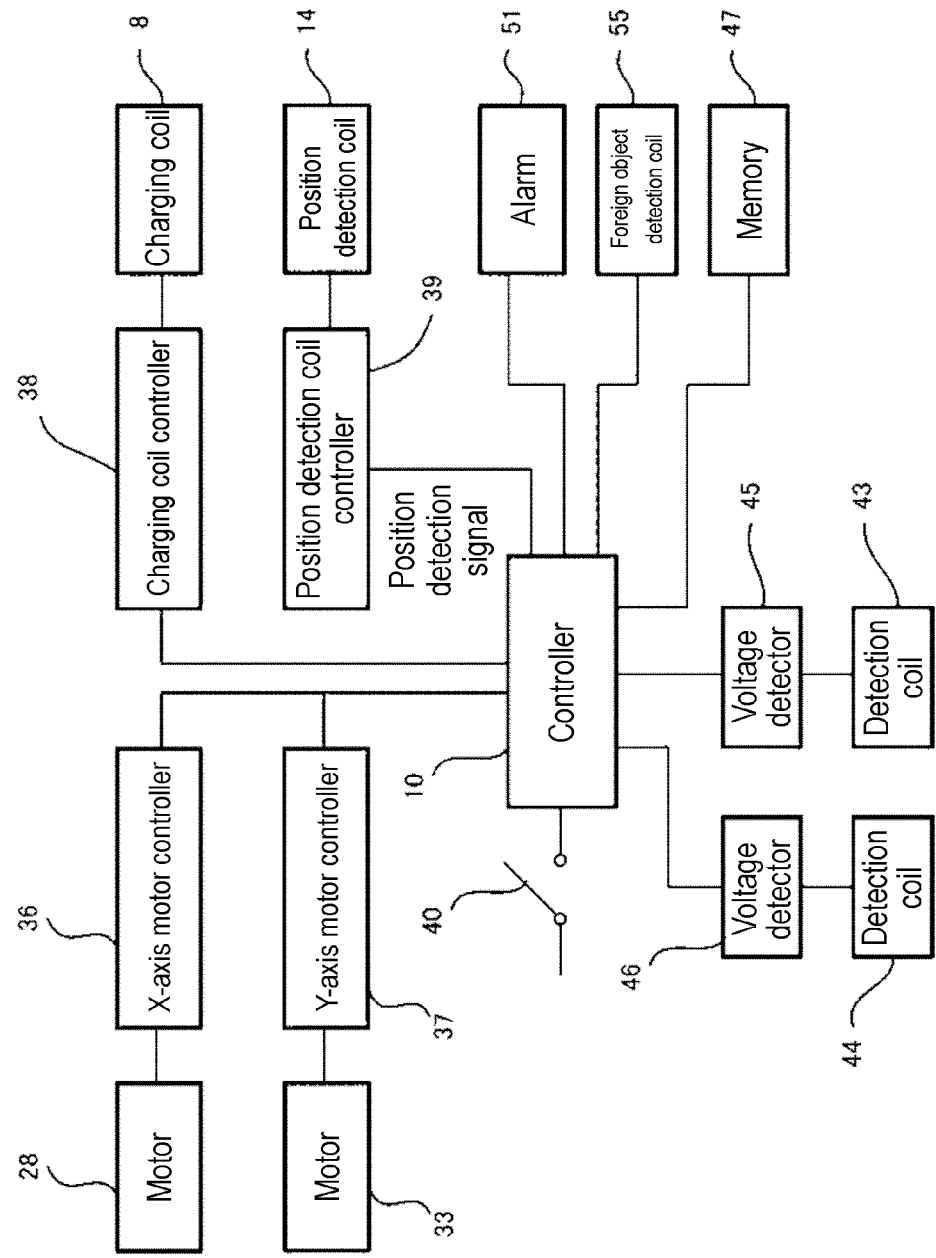
FIG. 9 is a control block diagram of the portable terminal charging apparatus illustrated in FIG. 2.

As illustrated in FIG. 9, controller 10 is connected to motor 28 via X-axis motor controller 36, and is connected to motor 33 via Y-axis motor controller 37. Controller 10 is connected to charging coil 8 via charging coil controller 38, and is also connected to position detection coil 14 via position detection coil controller 39.

Next, a description will be made of a configuration of detecting whether or not there is a foreign object on the front surface side (upper surface side) of front surface plate 11 during conduction of charging coil 8.

In the present exemplary embodiment, as described above, foreign object detection coil 55 detects whether or not there is a foreign object on the front surface side (upper surface side) of front surface plate 11 during non-conduction of charging coil 8.

Figure 12:
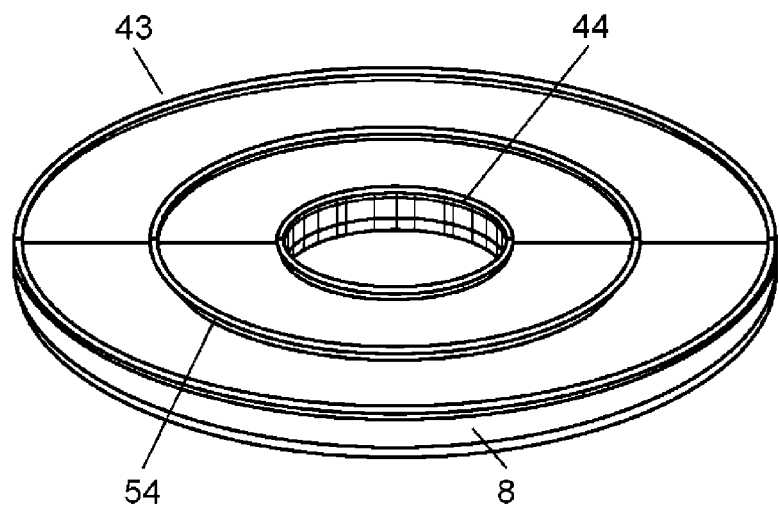
FIG. 12 is a perspective view illustrating a detection coil of the portable terminal charging apparatus illustrated in FIG. 2.
Figure 13:
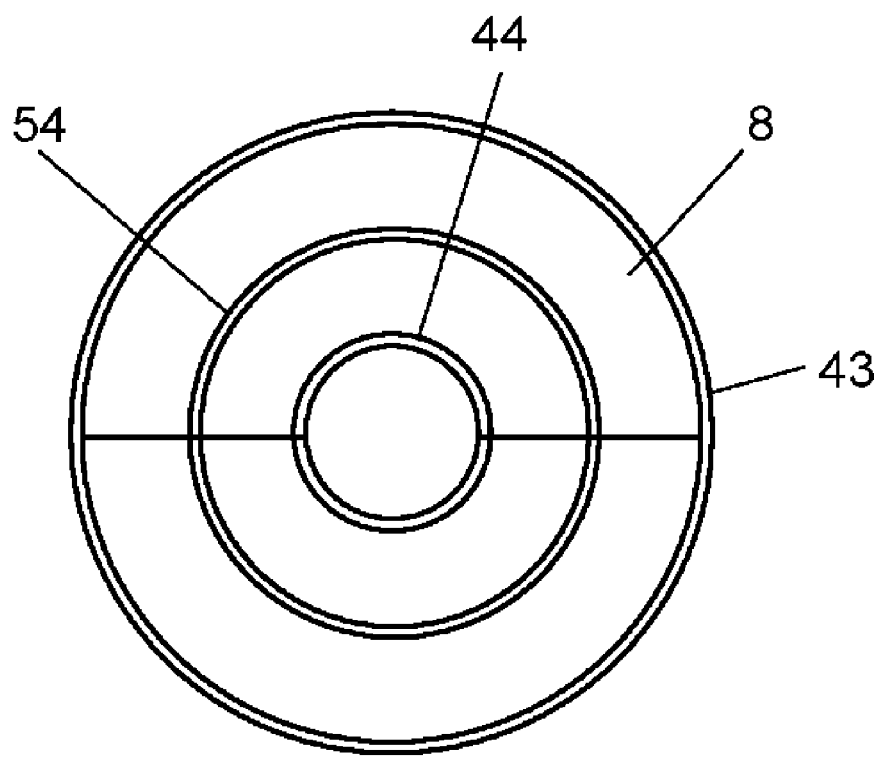
FIG. 13 is a plan view of the detection coil illustrated in FIG. 12.

On the other hand, during conduction of charging coil 8, the presence of a foreign object is detected by large diameter detection coil 43 illustrated in FIGS. 12 and 13 provided between charging coil 8 and the portable terminal placement portion of support plate 6, and detection coil 44 which is disposed inward of detection coil 43. Detection coil 44 has a smaller diameter than that of detection coil 43.

Specifically, detection coils 43 and 44 are disposed on the upper surface of charging coil 8 (the surface on support plate 6 side). Charging coil 8 is movable depending on a location where portable terminal 15 is placed.

Large diameter detection coil 43 has nearly the same size as the outer diameter of annular charging coil 8 (the detection coil is slightly smaller than the outer diameter of charging coil 8), and small diameter detection coil 44 has nearly the same size as the inner diameter of annular charging coil 8 (the detection coil is slightly larger than the inner diameter of charging coil 8).

As illustrated in FIG. 9, large diameter detection coil 43 and small diameter detection coil 44 are connected to controller 10 via voltage detectors 45 and 46, respectively.

Memory 47 illustrated in FIG. 9 stores a program or the like for performing a safety operation on metal foreign objects by using large diameter detection coil 43 and small diameter detection coil 44.

In the present exemplary embodiment, if a metal foreign object is present between the portable terminal placement portion (the upper surface of support plate 6) and portable terminal 15, it is found that a magnetic flux in the inner portion of charging coil 8 decreases, and, conversely, a magnetic flux in the outer portion increases, and this state is detected by large diameter detection coil 43 and small diameter detection coil 44.

Figure 14:
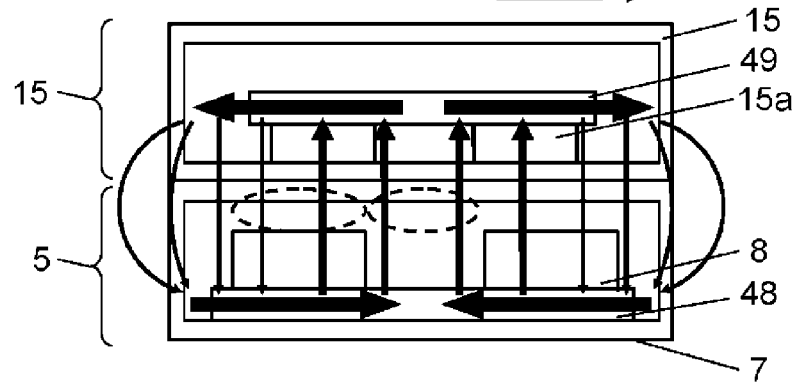
FIG. 14 is a diagram illustrating an operation of the portable terminal charging apparatus illustrated in FIG. 2.

Hereinafter, this state will be described with reference to FIGS. 14 to 18 simplified for better understanding. FIG. 14 illustrates a state in which portable terminal 15 is being charged in a state in which there is no metal foreign object between the portable terminal placement portion (the upper surface of support plate 6) and portable terminal 15 as in FIG. 3. In FIGS. 14 to 18, magnetic body 48 for forming a magnetic path is provided on a lower side (an opposite side to portable terminal 15) of charging coil 8 in main body case 7 of portable terminal charging apparatus 5.

Magnetic body 49 for forming a magnetic path is provided on an upper side (an opposite side to portable terminal charging apparatus 5) of terminal charging coil 15a in portable terminal 15.

If a charging operation is performed, as illustrated in FIG. 14, a magnetic flux from charging coil 8 is supplied to terminal charging coil 15a of portable terminal 15. This magnetic flux induces a voltage in terminal charging coil 15a, and thus portable terminal 15 is charged.

The magnetic flux having passed through terminal charging coil 15a returns to charging coil 8 via magnetic body 49, a space, and magnetic body 48 as indicated by arrows.

Figure 15:
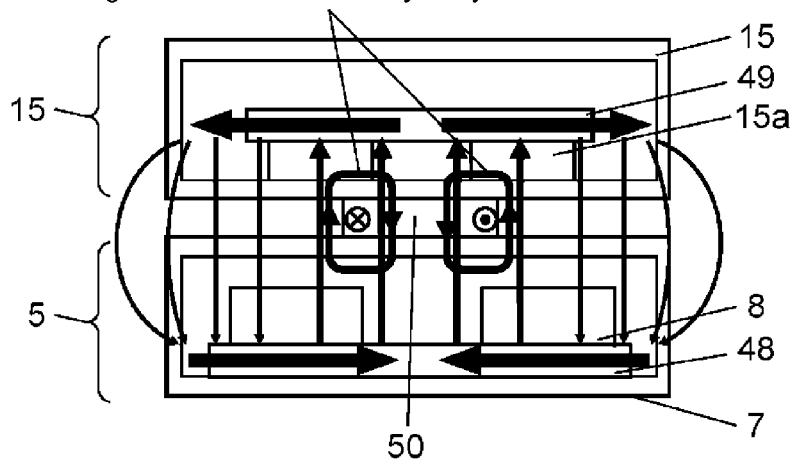
FIG. 15 is a diagram illustrating an operation of the portable terminal charging apparatus illustrated in FIG. 2.

In contrast, FIG. 15 illustrates a state in which portable terminal 15 is being charged in a state in which non-magnetic metal foreign object 50 (for example, a coin made of aluminum) is present between the portable terminal placement portion (the upper surface of support plate 6) and portable terminal 15. In this case, as illustrated in FIG. 15, an eddy current is induced in metal foreign object 50 by a magnetic flux passing through metal foreign object 50. As a result, a magnetic flux induced by the eddy current is generated.

The magnetic flux induced by the eddy current has a direction opposite to a direction of a magnetic flux directed from charging coil 8 toward terminal charging coil 15a in an inner portion of metal foreign object 50 (the central direction of charging coil 8). The magnetic flux induced by the eddy current has the same direction as the direction of the magnetic flux directed from charging coil 8 toward terminal charging coil 15a in other portions (a direction opposite to the center of charging coil 8).

Figure 16:
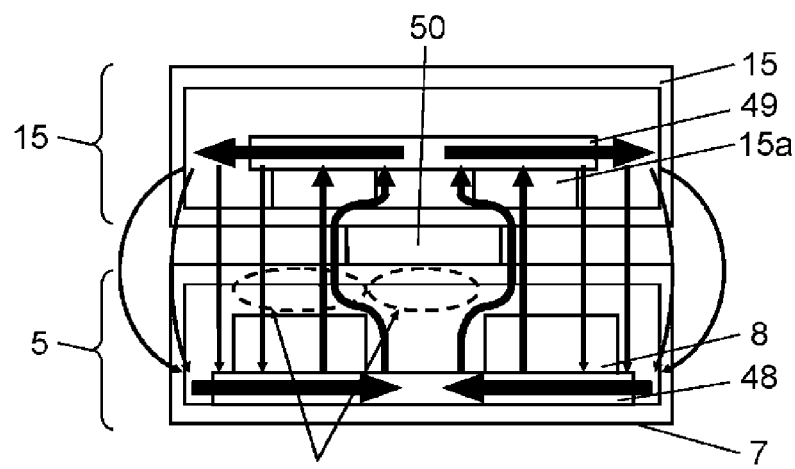
FIG. 16 is a diagram illustrating an operation of the portable terminal charging apparatus illustrated in FIG. 2.

As a result, as illustrated in FIG. 16, among the magnetic fluxes directed from charging coil 8 toward terminal charging coil 15a, a magnetic flux advancing in the inner circumferential direction of charging coil 8 is curved outward from the inner circumferential portion of charging coil 8 and is then directed toward terminal charging coil 15a. In other words, the magnetic flux in the inner circumferential portion of charging coil 8 decreases, and, conversely, the magnetic flux in the outer circumferential portion of charging coil 8 increases.

In this situation, in the present exemplary embodiment, detection coil 43 and detection coil 44 are provided on the upper surface side (terminal charging coil 15a side) of charging coil 8, and a state illustrated in FIG. 16 is detected by detection coils 43 and 44 as described above.

Specifically, a first voltage (V1) detected by large diameter detection coil 43 increases (as a result of there being a large number of magnetic fluxes, and a distance to the magnetic fluxes also becoming short). Conversely, a second voltage (V2) detected by small diameter detection coil 44 decreases (as a result of there being a small number of magnetic fluxes, and a distance to the magnetic fluxes also becoming long).

In the present exemplary embodiment, voltage detector 45 detects a peak voltage of the first voltage (V1) detected by large diameter detection coil 43. Voltage detector 46 detects a peak voltage of the second voltage (V2) detected by small diameter detection coil 44.

Controller 10 compares the ratio (V2/V1) of the second voltage (V2) to the first voltage (V1) with a set value (which is stored in memory 47 and is, for example, 0.7), and performs a safety operation on the basis of a comparison result.

As an example, in the state (the presence of metal foreign object 50) illustrated in FIG. 16, the second voltage (V2) detected by small diameter detection coil 44 is, for example, 25% smaller than in the state (the absence of metal foreign object 50) illustrated in FIG. 14.

In contrast, in the state (the presence of metal foreign object 50) illustrated in FIG. 16, the first voltage (V1) detected by large diameter detection coil 43 is, for example, 170% larger than in the state (the absence of metal foreign object 50) illustrated in FIG. 14.

As a result, the ratio (V2/V1) of the second voltage (V2) to the first voltage (V1) is reduced by half or less (0.5 or less) in the state (the presence of metal foreign object 50) illustrated in FIG. 16 compared with the state (the absence of metal foreign object 50) illustrated in FIG. 14.

Figure 2:
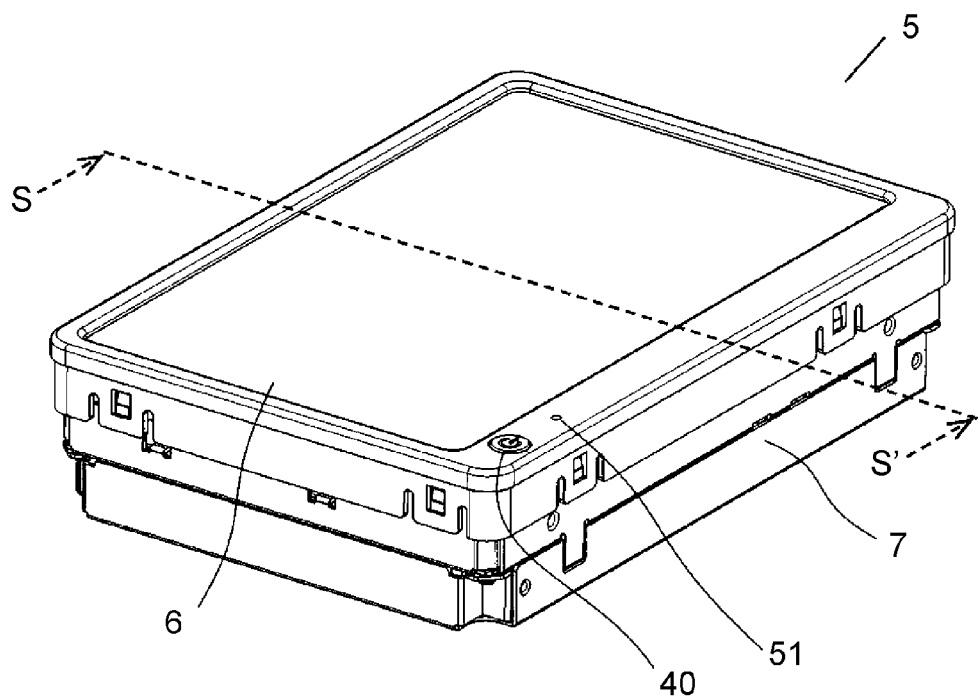
FIG. 2 is a perspective view illustrating the portable terminal charging apparatus according to the exemplary embodiment of the present invention.

Since the detected value (0.5 or less) is sufficiently smaller than the set value (0.7) stored in memory 47, controller 10 detects the presence of metal foreign object 50 so as to instantly stop the supply of a current to charging coil 8, and operates alarm 51 illustrated in FIGS. 2 and 9.

In other words, alarm 51 is connected to controller 10 as illustrated in FIG. 9, and thus performs a notification of an abnormal state with a light when metal foreign object 50 is present.

Figure 17:
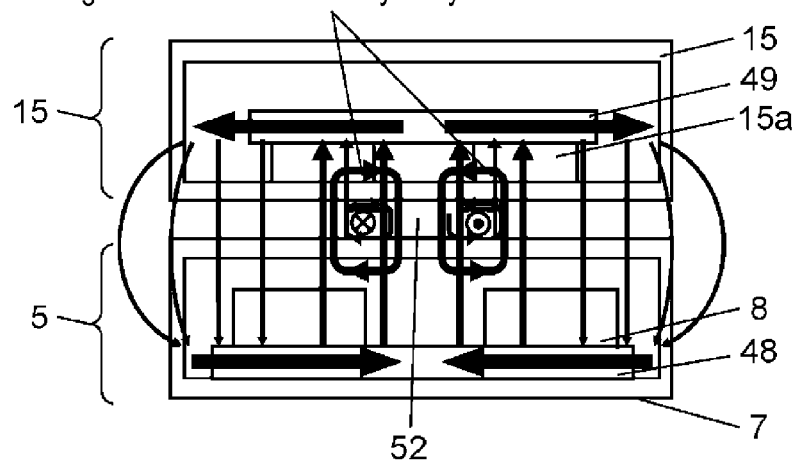
FIG. 17 is a diagram illustrating an operation of the portable terminal charging apparatus illustrated in FIG. 2.

Next, FIG. 17 illustrates a state in which portable terminal 15 is being charged in a state in which magnetic metal foreign object 52 (for example, an iron object) is present between the portable terminal placement portion (the upper surface of support plate 6) and portable terminal 15.

Also in this case, as illustrated in FIG. 17, an eddy current is induced in metal foreign object 52 by a magnetic flux passing through metal foreign object 52. As a result, a magnetic flux induced by the eddy current is generated.

This metal foreign object 52 is a magnetic body, and magnetic fluxes advancing into metal foreign object 52 include magnetic fluxes passing therethrough and magnetic fluxes advancing thereinto, for example, outward. Therefore, FIG. 17 illustrates the additional magnetic flux caused by the eddy current unlike FIG. 15.

However, the magnetic flux which is additionally generated in this way has a direction opposite to the direction of the magnetic flux directed from charging coil 8 toward terminal charging coil 15a in an inner portion thereof (the central direction of charging coil 8). The magnetic flux has the same direction as the direction of the magnetic flux directed from charging coil 8 toward terminal charging coil 15a in an outer portion (a direction opposite to the center of charging coil 8) of the magnetic flux indicated by the counterclockwise direction arrow.

Figure 18:
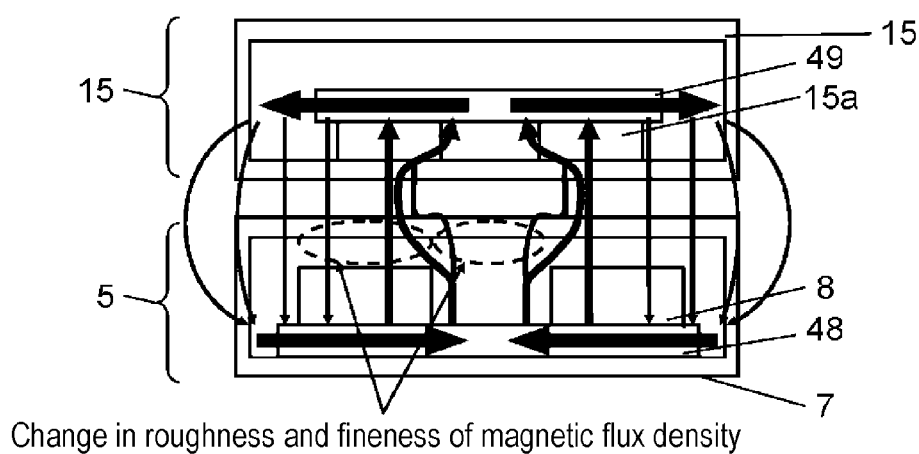
FIG. 18 is a diagram illustrating an operation of the portable terminal charging apparatus illustrated in FIG. 2.

As a result, as illustrated in FIG. 18, among the magnetic fluxes directed from charging coil 8 toward terminal charging coil 15a, a magnetic flux advancing in the inner circumferential direction of charging coil 8 is curved outward from the inner circumferential portion of charging coil 8 and is then directed toward terminal charging coil 15a (some magnetic fluxes advance into metal foreign object 52 in the outer circumference thereof). In other words, the magnetic flux in the inner circumferential portion of charging coil 8 decreases, and the magnetic flux in the outer circumferential portion of charging coil 8 increases.

This situation can be detected by large diameter detection coil 43 and small diameter detection coil 44 disposed on the upper surface side (terminal charging coil 15a side) of charging coil 8.

Specifically, the first voltage (V1) detected by large diameter detection coil 43 increases (as a result of there being a large number of magnetic fluxes, and a distance to the magnetic fluxes also becoming short), and, conversely, the second voltage (V2) detected by small diameter detection coil 44 decreases (as a result of there being a small number of magnetic fluxes, and a distance to the magnetic fluxes also becoming long).

A peak voltage of the first voltage (V1) detected by large diameter detection coil 43 is detected by voltage detector 45. A peak voltage of the second voltage (V2) detected by small diameter detection coil 44 is detected by voltage detector 46. Controller 10 compares the ratio (V2/V1) of the second voltage (V2) to the first voltage (V1) with a set value (which is stored in memory 47 and is, for example, 0.7), and performs a safety operation on the basis of a comparison result.

As an example, in the state (the presence of metal foreign object 52) illustrated in FIG. 17, the second voltage (V2) detected by small diameter detection coil 44 is, for example, 15% smaller than in the state (the absence of metal foreign object 50) illustrated in FIG. 14.

In contrast, in the state (the presence of metal foreign object 52) illustrated in FIG. 17, the first voltage (V1) detected by large diameter detection coil 43 is, for example, 170% larger than in the state (the absence of metal foreign object 52) illustrated in FIG. 14.

As a result, the ratio (V2/V1) of the second voltage (V2) to the first voltage (V1) is reduced by half or less (0.5 or less) in the state (the presence of metal foreign object 52) illustrated in FIG. 17 compared with the state (the absence of metal foreign object 52) illustrated in FIG. 14.

Since the detected value (0.5 or less) is sufficiently smaller than the set value (0.7) stored in memory 47, controller 10 detects the presence of metal foreign object 52 so as to instantly stop the supply of a current to charging coil 8, and operates alarm 51 illustrated in FIGS. 2 and 9. In other words, controller 10 lights alarm 51 so as to perform a notification of an abnormal state.

As described above, in the present exemplary embodiment, even if either of non-magnetic metal foreign object 50 and magnetic metal foreign object 52 is present between portable terminal placement portion (the upper surface of support plate 6) and portable terminal 15, it is found that a magnetic flux in the inner portion of charging coil 8 decreases, and, conversely, magnetic fluxes in other portions increase, and this state is detected by large diameter detection coil 43 and small diameter detection coil 44.

In other words, in a case where large diameter detection coil 43 detects an increase in the outer magnetic flux, the first voltage (V1) increases. If the inner magnetic flux decreases, the second voltage (V2) detected by small diameter detection coil 44 inversely decreases. Therefore, the ratio (V2/V1) between both voltages is sufficiently smaller than the set value, and, as a result, it is possible to reliably detect the presence of metal foreign object 50 or 52.

An operation of detecting metal foreign object 50 or 52 (determination based on the ratio V2/V1) is not substantially influenced by whether the metal foreign object is a magnetic body or a non-magnetic body, or the type of charged portable terminal 15. Therefore, the portable terminal charging apparatus can charge various portable terminals 15 with versatility and is considerably convenient to use.

In the present exemplary embodiment, a description has been made of an example in which portable terminal charging apparatus 5 is provided in vehicle interior 2 of automobile 1. This is because a coin or the like is frequently placed on support plate 6 in automobile 1. In other words, in automobile 1, portable terminal 15 is deviated from the upper surface of support plate 6 due to inertia of an advancing direction or vibration during driving of the vehicle. Thus, as a countermeasure therefor, as illustrated in FIG. 3, guard portion 53 protruding upward from support plate 6 is provided at the outer circumference of support plate 6. As a result, a state occurs in which a coin hardly falls off during driving of the vehicle, and this causes the coin to be placed on support plate 6. Therefore, it is very useful to provide portable terminal charging apparatus 5 of the present exemplary embodiment in vehicle interior 2 of automobile 1.

In the present exemplary embodiment, a description has been made of an example in which large diameter detection coil 43 and small diameter detection coil 44 are provided on the upper surface side of charging coil 8 (terminal charging coil 15*a* side). Further, as illustrated in FIGS. 12 and 13, there may be a configuration in which intermediate diameter detection coil 54 is provided between large diameter detection coil 43 and small diameter detection coil 44 and is also connected to controller 10. In other words, if intermediate diameter detection coil 54 is provided, switching between the detection coils 43, 44 and 54 for comparison can be performed, or situations between detection coils 43 and 54, and 54 and 44 can be detected.

Figure 19:
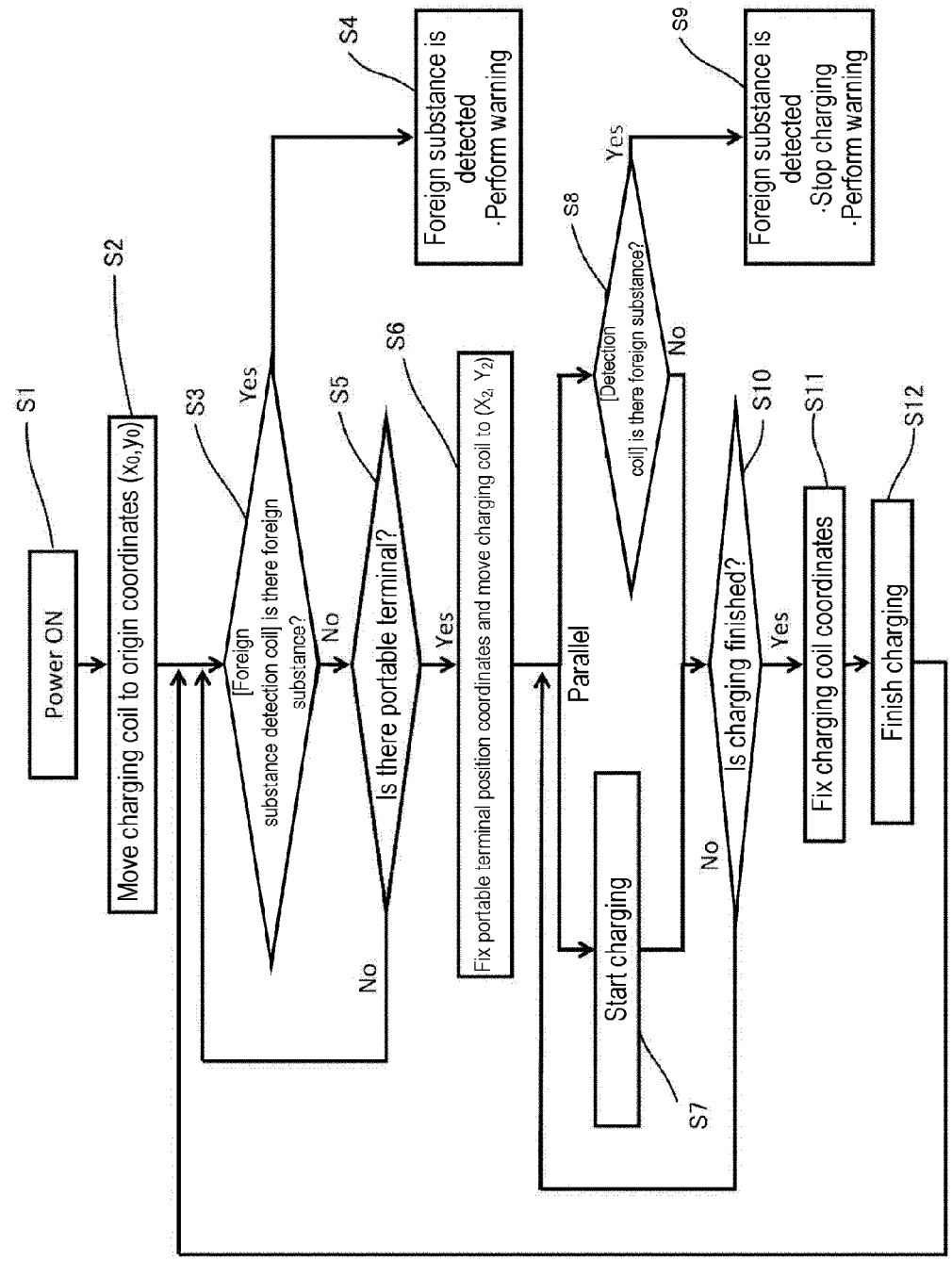
FIG. 19 is a flowchart illustrating an operation of the portable terminal charging apparatus illustrated in FIG. 2.

In the above-described configuration, in the present exemplary embodiment, if power switch 40 illustrated in FIGS. 2 and 9 is turned on (step S1 in FIG. 19), a position of charging coil 8 is initialized (step S2 in FIG. 19).

Figure 7:
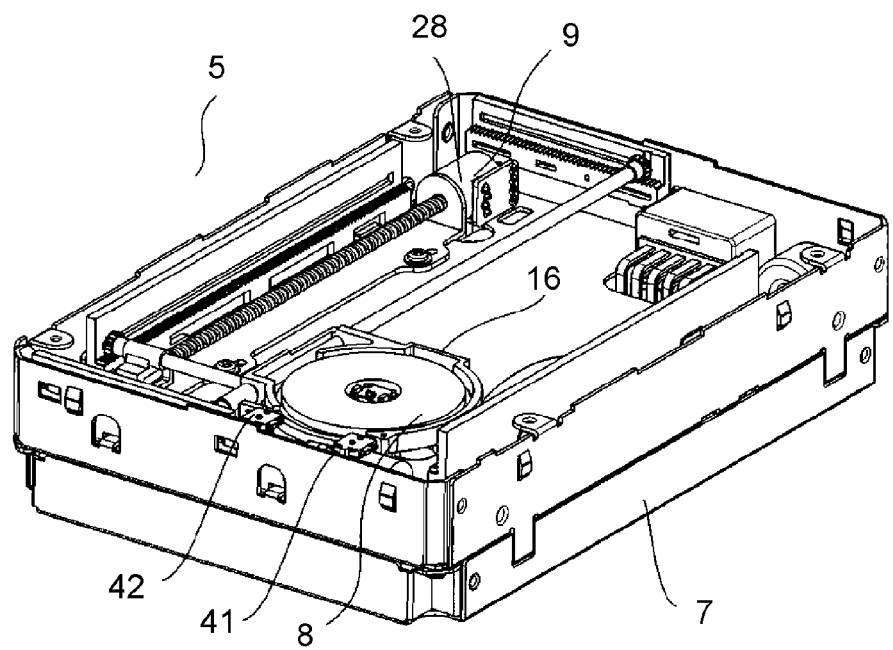
FIG. 7 is a perspective view illustrating another state of the portable terminal charging apparatus illustrated in FIG. 4.
Figure 8:
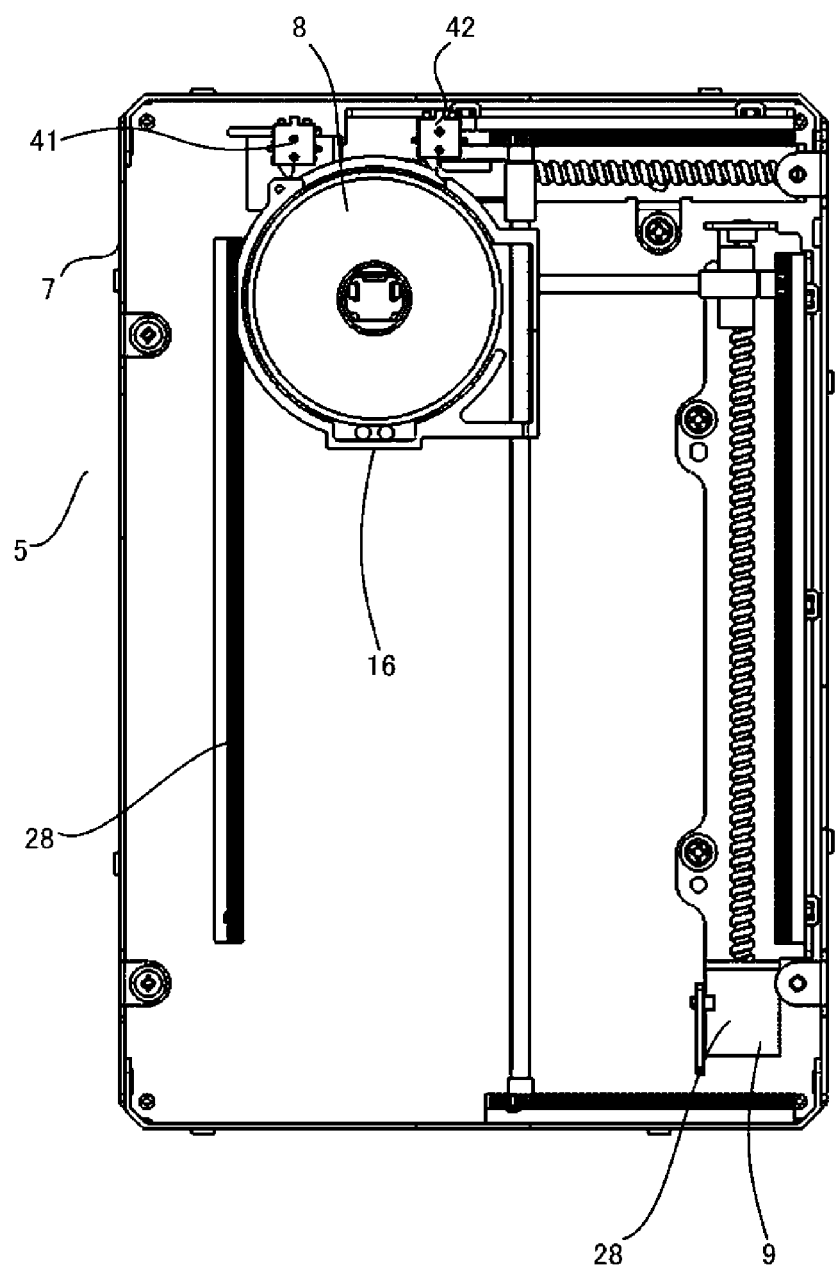
FIG. 8 is a plan view illustrating the portable terminal charging apparatus in the state illustrated in FIG. 7.

The position initialization indicates that charging coil 8 is returned to the corner (coordinates xo and yo) illustrated in FIG. 7 by driving motors 28 and 33. In other words, switches 41 and 42 are present at the corner, and, if charging coil 8 is moved to the corner inside main body case 7 provided with switches 41 and 42, switches 41 and 42 are operated, and thus controller 10 determines that a position of charging coil 8 has been initialized.

Next, controller 10 supplies detection pulses to the above-described eight foreign object detection coils 55, respectively. In a case where a resonance frequency of each of foreign object detection coils 55 is lower than a reference resonance frequency, held in memory 47, for each location where charging coil 8 is present, or in a case where a resonance voltage detected by each foreign object detection coil 55 is higher than a reference resonance voltage, held in memory 47, for each location where charging coil 8 is present, a safety operation is performed (steps S3 and S4 in FIG. 19).

Figure 20:
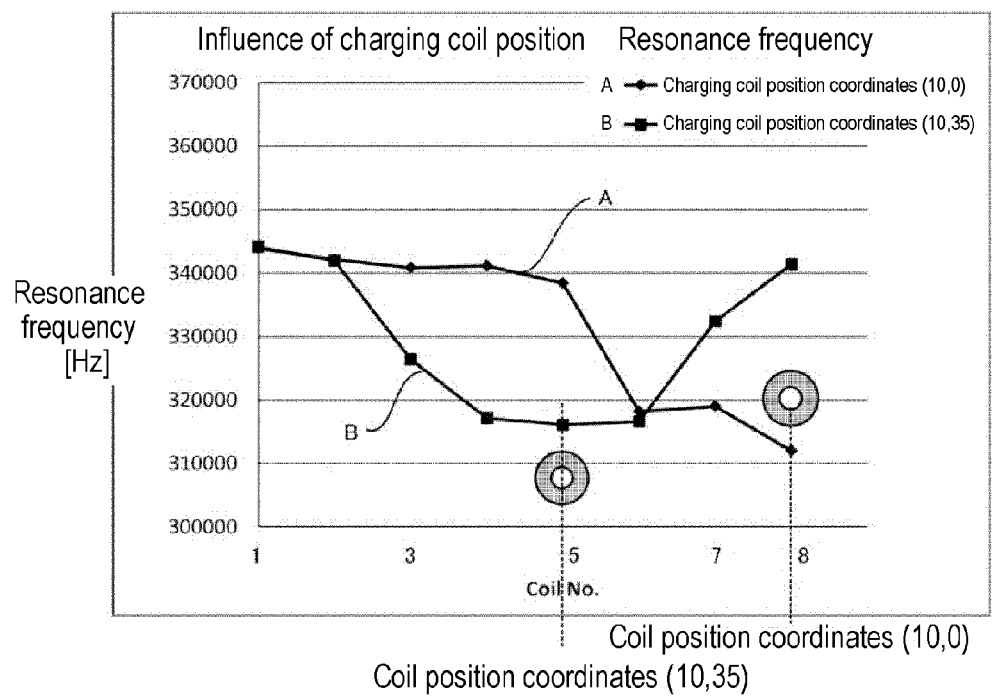
FIG. 20 is a diagram illustrating an operation of the portable terminal charging apparatus illustrated in FIG. 2.

In relation to detailed description thereof, FIG. 20 illustrates a state in which a resonance frequency of corresponding foreign object detection coil 55 is influenced by a location where charging coil 8 is present.

Specifically, line A of FIG. 20 indicates resonance frequencies of respective foreign object detection coils 55 when charging coil 8 is present at coordinates (10,0), and indicates a situation in which resonance frequencies of foreign object detection coils 55 near charging coil 8 are lowered.

Line B of FIG. 20 indicates resonance frequencies of respective foreign object detection coils 55 when charging coil 8 is present at coordinates (10,35), and indicates a situation in which resonance frequencies of foreign object detection coils 55 near charging coil 8 are lowered.

Figure 21:
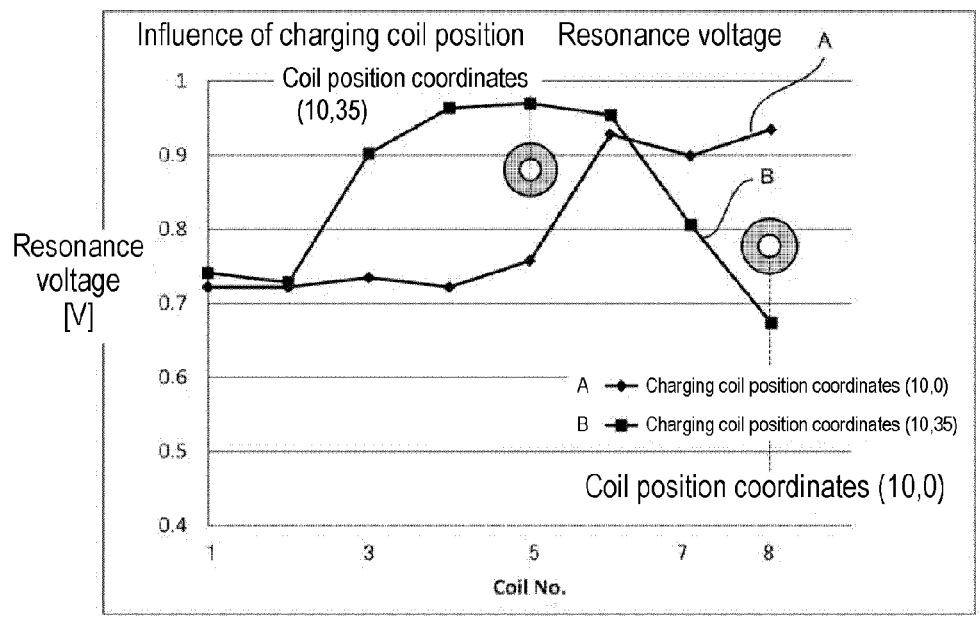
FIG. 21 is a diagram illustrating an operation of the portable terminal charging apparatus illustrated in FIG. 2.

Line A of FIG. 21 indicates resonance voltages of respective foreign object detection coils 55 when charging coil 8 is present at coordinates (10,0), and indicates a situation in which resonance voltages of foreign object detection coils 55 near charging coil 8 are heightened.

Line B of FIG. 21 indicates resonance voltages of respective foreign object detection coils 55 when charging coil 8 is present at coordinates (10,35), and indicates a situation in which resonance voltages of foreign object detection coils 55 near charging coil 8 are heightened.

In other words, it has been found that a resonance frequency of foreign object detection coil 55 near charging coil 8 is lowered, and, conversely, a resonance voltage of foreign object detection coil 55 near charging coil 8 is heightened.

Figure 22:
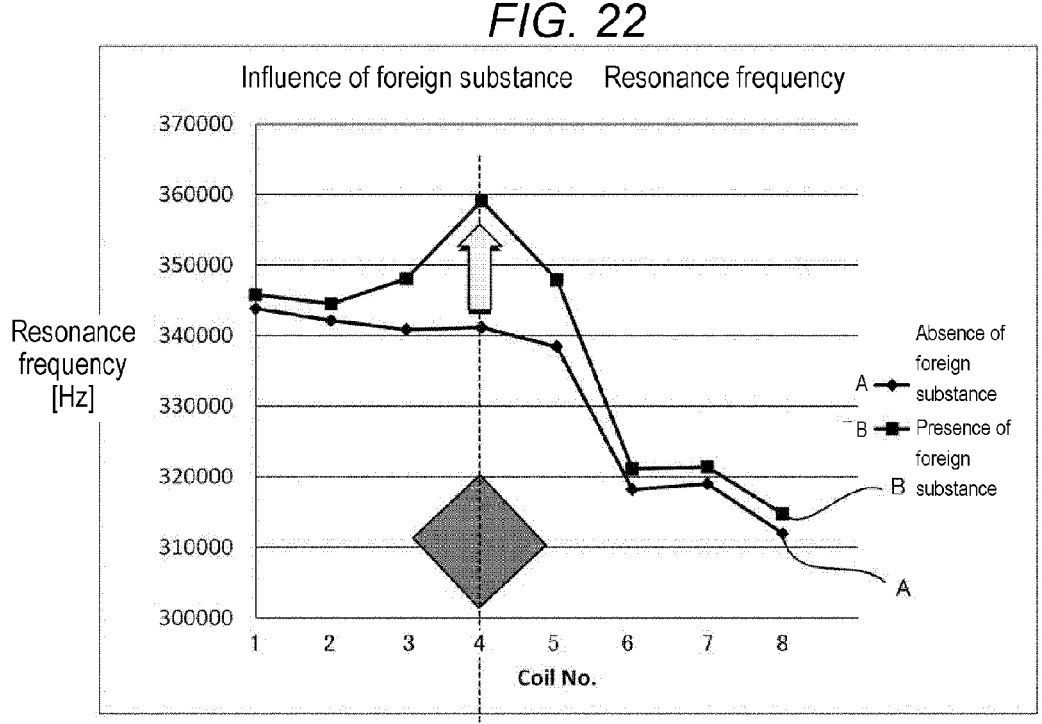
FIG. 22 is a diagram illustrating an operation of the portable terminal charging apparatus illustrated in FIG. 2.

Line A of FIG. 22 indicates resonance frequencies of respective foreign object detection coils 55 in a case where a metal foreign object is absent when charging coil 8 is present at coordinates (10,0).

Line B of FIG. 22 indicates resonance frequencies of respective foreign object detection coils 55 in a case where a metal foreign object is present at fourth foreign object detection coil 55 when charging coil 8 is present at coordinates (10,0), and indicates a situation in which resonance frequencies of foreign object detection coils 55 near charging coil 8 are heightened.

Figure 23:
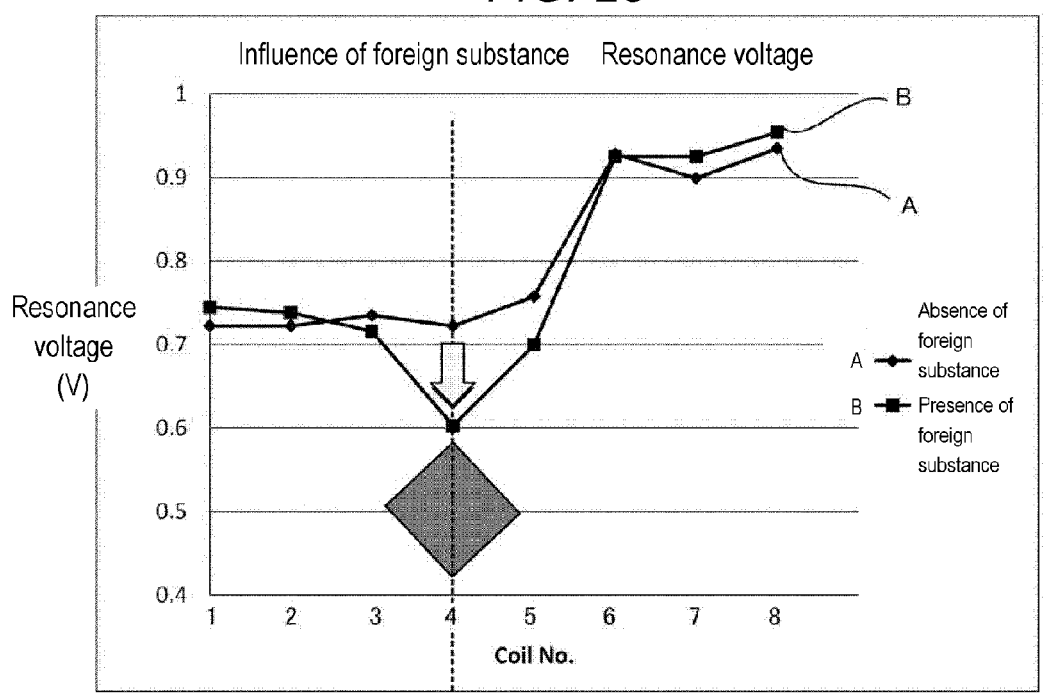
FIG. 23 is a diagram illustrating an operation of the portable terminal charging apparatus illustrated in FIG. 2.

Line A of FIG. 23 indicates resonance voltages of respective foreign object detection coils 55 in a case where a metal foreign object is absent when charging coil 8 is present at coordinates (10,0).

Line B of FIG. 23 indicates resonance voltages of respective foreign object detection coils 55 in a case where a metal foreign object is present at fourth foreign object detection coil 55 when charging coil 8 is present at coordinates (10,0), and indicates a situation in which resonance voltages of foreign object detection coils 55 near charging coil 8 are lowered.

In other words, it has been found that a resonance frequency of foreign object detection coil 55 near the metal foreign object is heightened, and, conversely, a resonance voltage of foreign object detection coil 55 near the metal foreign object is lowered.

In the present exemplary embodiment, a metal foreign object is detected by foreign object detection coil 55 during non-conduction of charging coil 8 on the basis of such a phenomenon.

Specifically, memory 47 stores a reference resonance frequency and a reference resonance voltage of each foreign object detection coil 55 for each location where charging coil 8 is present.

In this state, first, controller 10 detects a location where charging coil 8 is present by using position detection coil 14 (an example of a charging coil position detector), or switches 41 and 42 detecting that charging coil 8 has returned to the corner (coordinates xo and yo) illustrated in FIG. 7.

Figure 24:
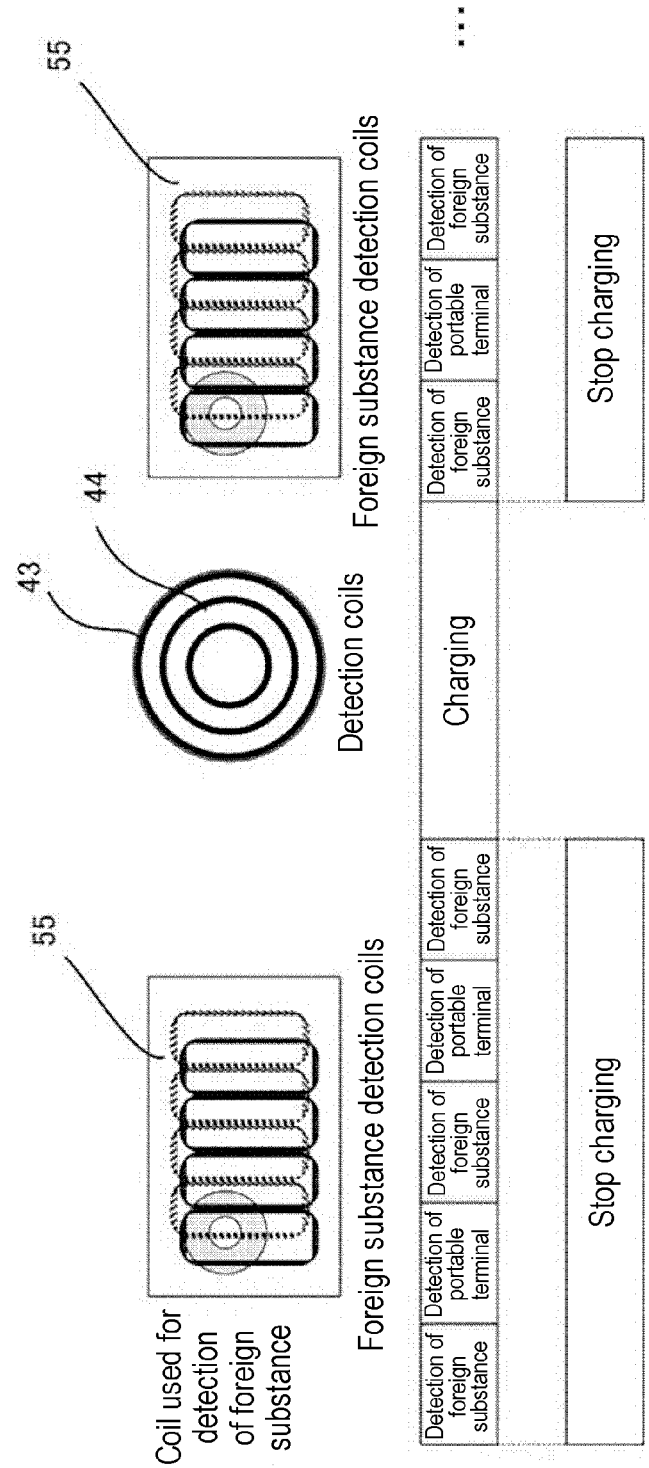
FIG. 24 is a diagram illustrating an operation of the portable terminal charging apparatus illustrated in FIG. 2.

In the present exemplary embodiment, as illustrated in FIG. 24, in a state in which power switch 40 is turned on, during non-conduction of charging coil 8, foreign object detection performed by foreign object detection coil 55 and position detection of charging coil 8 performed by position detection coil 14 and switches 41 and 42 are alternately repeatedly performed.

As illustrated in FIGS. 22 and 23, for example, if resonance frequencies detected by eight foreign object detection coils 55 are higher than the resonance frequencies stored in memory 47 in advance by a predetermined value or more, or resonance voltages detected by eight foreign object detection coils 55 are lower than the resonance voltages stored in memory 47 in advance by a predetermined value or more through the operation, controller 10 identifies the presence of a foreign object, and performs a safety operation (steps S3 and S4 in FIG. 19).

The safety operation during non-conduction of charging coil 8 is performed by alarm 51, but, there may be a configuration in which, if the metal foreign object is not removed thereafter, conduction of charging coil 8 cannot be performed.

Next, in a case where portable terminal 15 is placed at any position of the portable terminal placement portion which is the upper surface of support plate 6 as illustrated in FIG. 3, position detection coil 14 detects a location where the portable terminal is placed (step S5 in FIG. 19). Next, driver 9 moves charging coil 8 to the location (step S6 in FIG. 19). Next, controller 10 performs conduction of charging coil 8 (step S7 in FIG. 19), and a foreign object detection operation in large diameter detection coil 43 and small diameter detection coil 44 provided on the upper surface side of charging coil 8 (terminal charging coil 15a side) (step S8 in FIG. 19).

If a metal foreign object is detected during charging, controller 10 causes the alarm to issue a warning with alarm 51 and stops charging using charging coil 8 as a safety operation (step S9 in FIG. 19).

Next, portable terminal 15 may be subsequently placed on the upper surface of support plate 6 in a state in which charging is finished (step S10 in FIG. 19). Therefore, controller 10 stores a position of charging coil 8 in memory 47 (step S11 in FIG. 19), and finishes charging (step S12 in FIG. 19).

In other words, in a charging stop state after the charging as illustrated in FIG. 24, the above-described non-conduction state of charging coil 8 occurs. In this case, foreign object detection performed by foreign object detection coil 55 and position detection of charging coil 8 performed by position detection coil 14 and switches 41 and 42 are alternately repeatedly performed.

As is clear from the above description, since it is important that a position of charging coil 8 be specified at this time in order to detect a foreign object, controller 10 stores the position of charging coil 8 in memory 47 (step S11 in FIG. 19) and finishes charging (step S12 in FIG. 19).

In other words, since resonance frequencies or resonance voltages of eight foreign object detection coils 55 are influenced by a position of charging coil 8, information corresponding to the position of charging coil 8 is read from memory 47, and appropriate foreign object detection is performed on the basis of the read information.

The fundamental configuration and operation of the present exemplary embodiment are understood from the above description, and thus a major characteristic point of the present exemplary embodiment will be described.

The major characteristic point is a configuration of detecting whether or not the ratio (V2/V1) of the second voltage (V2) detected by small diameter detection coil 44 to the first voltage (V1) detected by large diameter detection coil 43 is lower than a first set value held in the memory between starting of conduction of charging coil 8 and connection of the charging load of portable terminal 15. Consequently, even if models of portable terminals 15 are different from each other, a foreign object can be reliably detected.

Prior to sequential description thereof, a Qi standard (international standard for wireless power supply established by Wireless Power Consortium (WPC)) is present in wireless power supply as in the present exemplary embodiment.

In the Qi standard, the following phases (1) to (4) are present from starting of a charging operation to execution thereof.

(1) Device detection phase (Selection)
(2) Reaction checking phase (Ping)
(3) Authentication and configuration phase (Identification & Configuration)
(4) Power transfer phase (Power Transfer)

In the present exemplary embodiment, the above content "between starting of conduction of charging coil 8 and connection of the charging load of portable terminal 15" corresponds to the phases (1) to (3) in the Qi standard.

The phase (4) may also correspond to "between starting of conduction of charging coil 8 and connection of the charging load of portable terminal 15" in an initial state thereof.

Figure 25:
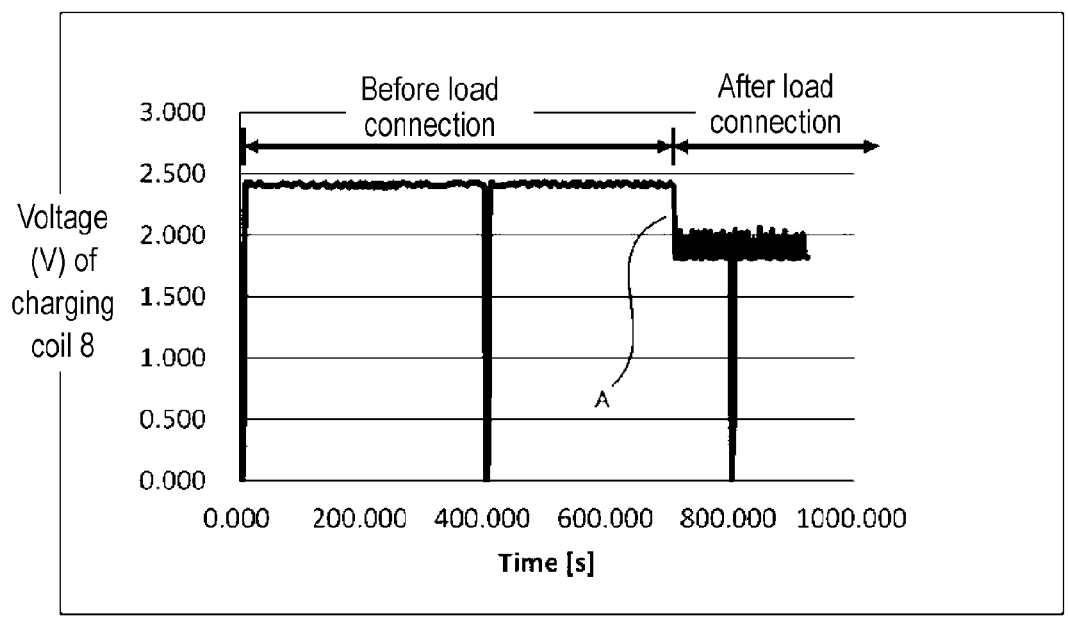
FIG. 25 is a diagram illustrating an operation of the portable terminal charging apparatus illustrated in FIG. 2.

In other words, FIG. 25 illustrates an example of a voltage state of charging coil 8 in a state in which the phases (1) to (4) in the Qi standard are executed.

A state before load connection in FIG. 25 corresponds to the phases (1) to (3) and the first half of the phase (4) in the Qi standard, and a state after load connection corresponds to a state later than the first half of the phase (4). As can be understood from FIG. 25, a voltage of charging coil 8 rapidly decreases after load connection.

Figure 26:
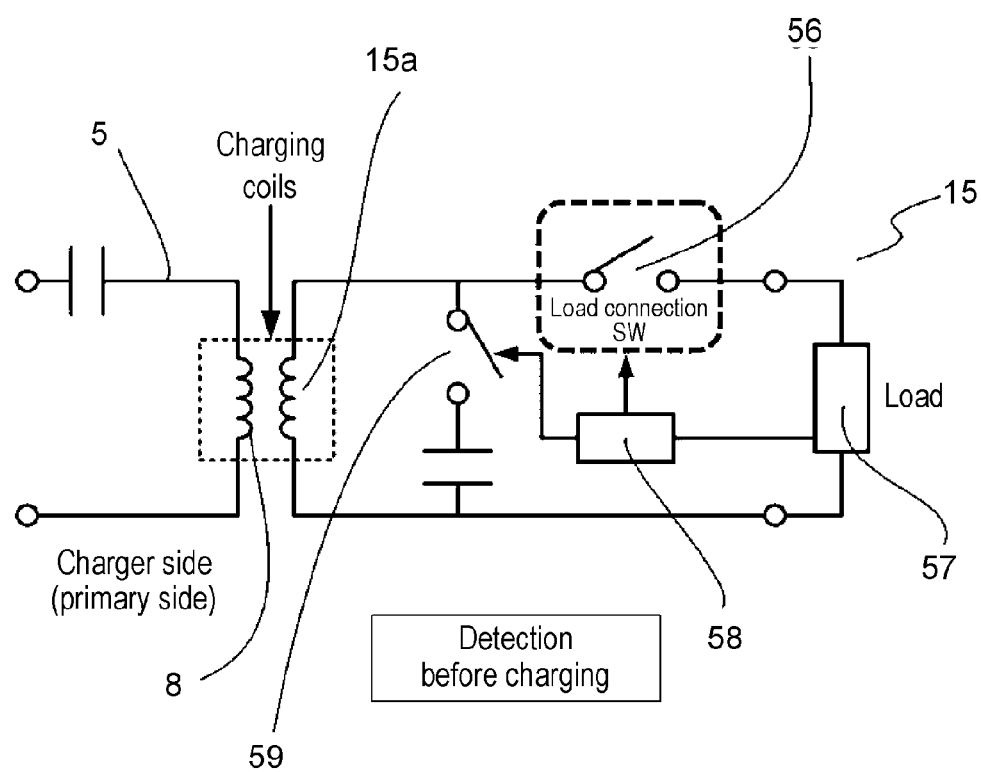
FIG. 26 is a diagram illustrating an operation of the portable terminal charging apparatus illustrated in FIG. 2.
Figure 27:
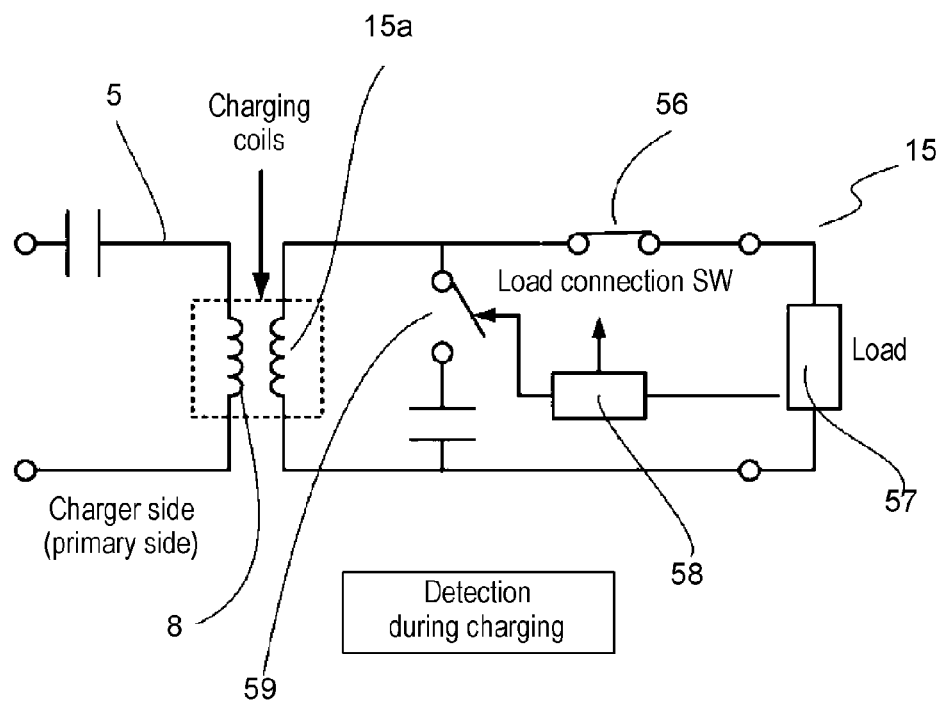
FIG. 27 is a diagram illustrating an operation of the portable terminal charging apparatus illustrated in FIG. 2.

This is because, load connection switch 56, in an OFF state, of portable terminal 15 schematically illustrated in FIG. 26 enters the phase (4), the load connection switch is turned on as illustrated in FIG. 27, and thus voltage drop temporarily occurs.

FIGS. 26 and 27 are schematic diagrams used to describe states before load connection (FIG. 26) of portable terminal 15 and after load connection (FIG. 27) thereof. In actual portable terminal 15, load 57 in FIGS. 26 and 27 includes, for example, a battery to be charged, a display, or a mobile phone communication portion.

Controller 58 turns on and off switch 59 by being supplied with power from a battery of load 57 regardless of connection of load connection switch 56, so as to perform load modulation. Consequently, communication in the phases (1) to (4) is performed on portable terminal charging apparatus 5.

However, switching of load connection switch 56 of portable terminal 15 from an OFF state to an ON state, and the occurrence of voltage drop and a subsequent voltage change as a result of the switching, differ depending on the type of portable terminal 15 to be charged.

Therefore, before load connection of portable terminal 15, by employing "the configuration of detecting whether or not the ratio (V2/V1) of the second voltage (V2) detected by small diameter detection coil 44 to the first voltage (V1) detected by large diameter detection coil 43 is lower than the first set value held in the memory", it is possible to appropriately detect a foreign object regardless of the type of portable terminal 15 to be charged.

Such an operation is performed by controller 10 illustrated in FIG. 9 in step S8 in FIG. 19. In other words, in a case where portable terminal 15 is placed on the portable terminal placement portion which is the upper surface of support plate 6 as illustrated in FIG. 3, position detection coil 14 detects a location where the portable terminal is placed (step S5 in FIG. 19). Next, driver 9 moves charging coil 8 to the location (step S6 in FIG. 19). If this state is made to correspond to the Qi standard, the state corresponds to the device detection phase (Selection) of (1) and the reaction checking phase (Ping) of (2).

Next, controller 10 performs conduction of charging coil 8 (step S7 in FIG. 19), and a foreign object detection operation in large diameter detection coil 43 and small diameter detection coil 44 provided on the upper surface side of charging coil 8 (terminal charging coil 15a side) (step S8 in FIG. 19).

After conduction of charging coil 8, the authentication and configuration phase (Identification & Configuration) of (3) in the Qi standard is executed. During the authentication and configuration phase (Identification & Configuration) of (3), a foreign object detection operation in large diameter detection coil 43 and small diameter detection coil 44 provided on the upper surface side of charging coil 8 (terminal charging coil 15a side) is performed (step S8 in FIG. 19).

More detailed description of step S8 in FIG. 19 executed by controller 10 illustrated in FIG. 9 will be made with reference to FIG. 28. In other words, controller 10 monitors whether or not the authentication and configuration phase (Identification & Configuration) of (3) in the Qi standard is completed (step S1 in FIG. 28). If the phase is not completed, a foreign object detection operation in large diameter detection coil 43 and small diameter detection coil 44 provided on the upper surface side of charging coil 8 (terminal charging coil 15a side) is performed in the state (before connection of load 57) illustrated in FIG. 26 (step S2 in FIG. 28).

In other words, as described above, voltage detector 45 detects a peak voltage of the first voltage (V1) detected by large diameter detection coil 43. Voltage detector 46 detects a peak voltage of the second voltage (V2) detected by small diameter detection coil 44. Controller 10 compares the ratio (V2/V1) of the second voltage (V2) to the first voltage (V1) with a set value (which is stored in memory 47 and is, for example, 0.7), and performs a safety operation on the basis of a comparison result.

As an example, in the state (the presence of metal foreign object 52) illustrated in FIG. 17, the second voltage (V2) detected by small diameter detection coil 44 is, for example, 15% smaller than in the state (the absence of metal foreign object 50) illustrated in FIG. 14.

In contrast, in the state (the presence of metal foreign object 52) illustrated in FIG. 17, the first voltage (V1) detected by large diameter detection coil 43 is, for example, 170% larger than in the state (the absence of metal foreign object 50) illustrated in FIG. 14.

As a result, the ratio (V2/V1) of the second voltage (V2) to the first voltage (V1) is reduced by half or less (0.5 or less) in the state (the presence of metal foreign object 52) illustrated in FIG. 17 compared with the state (the absence of metal foreign object 50) illustrated in FIG. 14.

Figure 28:
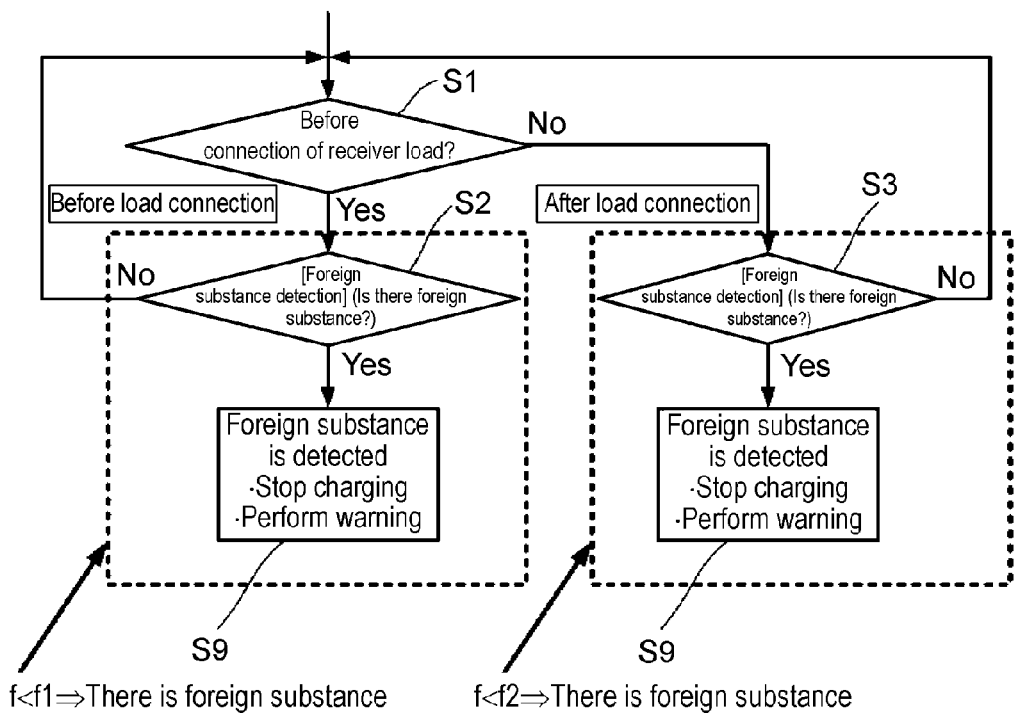
FIG. 28 is a flowchart illustrating an operation of the portable terminal charging apparatus illustrated in FIG. 2.

Since the detected value (0.5 or less) is sufficiently smaller than the set value (0.7 which is expressed as f1 in FIG. 28) stored in memory 47, controller 10 detects the presence of metal foreign object 52 so as to instantly stop the supply of a current to charging coil 8, and operates alarm 51 illustrated in FIGS. 2 and 9 (step S9 in FIGS. 19 and 28).

In other words, controller 10 lights alarm 51 so as to perform a notification of an abnormal state.

As described above, in the present exemplary embodiment, it is monitored whether or not the authentication and configuration phase (Identification & Configuration) of (3) in the Qi standard is completed (step S1 in FIG. 28). If the phase is not completed, a foreign object detection operation in large diameter detection coil 43 and small diameter detection coil 44 provided on the upper surface side of charging coil 8 (terminal charging coil 15a side) is performed in the state (before connection of load 57) illustrated in FIG. 26.

Thus, a foreign object detection operation is reliably performed regardless of the type of portable terminal 15. In other words, even if either of non-magnetic metal foreign object 50 and magnetic metal foreign object 52 is present between the portable terminal placement portion (upper surface of support plate 6) and portable terminal 15, a state, in which a magnetic flux in the inner portion of charging coil 8 decreases, and, conversely, a magnetic flux in the outer portion thereof increases, is detected by large diameter detection coil 43 and small diameter detection coil 44, and thus it is possible to reliably detect a foreign object.

Specifically, in a case where the increase in a magnetic flux in the outer portion is detected by large diameter detection coil 43, the first voltage (V1) increases. Conversely, if a magnetic flux in the inner portion decreases, the second voltage (V2) detected by small diameter detection coil 44 decreases. Therefore, the ratio (V2/V1) is sufficiently less than the set value, and, as a result, it is possible to reliably detect the presence of metal foreign objects 50 and 52 and thus to reliably perform a safety operation.

An operation of detecting metal foreign object 50 or 52 (determination based on the ratio V2/V1) is not substantially influenced by whether the metal foreign object is a magnetic body or a non-magnetic body, or the type of charged portable terminal 15. Therefore, the portable terminal charging apparatus can charge various portable terminals 15 with versatility and is considerably convenient to use.

In a case where controller 10 determines that the authentication and configuration phase (Identification & Configuration) of (3) in the Qi standard is completed in (step S1 in FIG. 28), a foreign object detection operation in large diameter detection coil 43 and small diameter detection coil 44 provided on the upper surface side of charging coil 8 (terminal charging coil 15*a* side) is performed in the state (after connection of load 57) illustrated in FIG. 27 (step S3 in FIG. 28).

In other words, as described above, voltage detector 45 detects a peak voltage of the first voltage (V1) detected by large diameter detection coil 43, and voltage detector 46 detects a peak voltage of the second voltage (V2) detected by small diameter detection coil 44. Controller 10 compares the ratio (V2/V1) of the second voltage (V2) to the first voltage (V1) with a different set value (which is stored in memory 47 and is, for example, 0.4 which is expressed as f2 in FIG. 28), and performs a safety operation on the basis of a comparison result.

In other words, if the power transfer phase (Power Transfer) of (4) occurs, as described in FIG. 25, since a different voltage change occurs for each type of portable terminal 15, a state occurs in which the portable terminal is wrongly detected as a foreign object in a case where the ratio is compared with the set value (for example, 0.7 which is stored in memory 47) when the load connection is detected.

Thus, after load connection, a foreign object is detected through comparison with another set value (for example, 0.4) stored in the memory.

Since the ratio (V2/V1) of the second voltage (V2) to the first voltage (V1) is sufficiently smaller than the set value (0.4) held in memory 47, controller 10 detects the presence of metal foreign object 52 so as to instantly stop the supply of a current to charging coil 8, and operates alarm 51 illustrated in FIGS. 2 and 9 (step S9 in FIGS. 19 and 28). In other words, controller 10 lights alarm 51 so as to perform a notification of an abnormal state.

If the above configuration (charging a set value for comparison before load connection and after load connection) is employed, detection accuracy after load connection is slightly reduced. However, inherently, it is important to perform foreign object detection as in an early stage (the phases (1) to (3)) as possible before a charging operation is started, and, in this stage, a foreign object can be reliably detected. Therefore, the slight reduction of detection accuracy after load connection is not greatly problematic in practice.

However, a metal foreign object may be interposed between the portable terminal placement portion (the upper surface of support plate 6) and portable terminal 15 even in a case where a charging operation is being performed (the above phase (4)). Therefore, it is also effective to perform the foreign object detection operation after load connection.

In the above-described exemplary embodiment, the period before load connection corresponds to the period of the phases (1) to (3) in the Qi standard, but the period after the phase (3) in the Qi standard, for example, the period before voltage drop (A) is detected in FIG. 25 may be set to the period before load connection, and the operation illustrated in FIG. 28 may be performed as the period after load connection if the voltage drop (A) is detected.

As mentioned above, in the present invention, it is detected whether or not the ratio (V2/V1) of the second voltage (V2) detected by the second detection coil to the first voltage (V1) detected by the first detection coil is less than the first set value held in the memory between starting of conduction of the charging coil and connection of the charging load of the portable terminal. Consequently, even if models of portable terminals are different from each other, a foreign object can be reliably detected. Therefore, the portable terminal charging apparatus is expected as an on-vehicle charging apparatus or a household charging apparatus.

The invention claimed is:

1. A portable terminal charging apparatus comprising:
    a support plate whose front surface side is used as a portable terminal placement portion;
    a charging coil that charges a portable terminal placed on the portable terminal placement portion;
    a controller that is connected to the charging coil; and
    a memory that is connected to the controller,
    wherein the charging coil is provided with a first detection coil, and a second detection coil disposed inward of the first detection coil and having a smaller diameter than a diameter of the first detection coil, and the first and second detection coils are connected to the controller, and
    wherein, if a ratio (V2/V1) of a second voltage (V2) detected by the second detection coil to a first voltage (V1) detected by the first detection coil is less than a first set value held in the memory between starting of conduction of the charging coil and connection of a charging load of the portable terminal, the controller performs a safety operation.

2. The portable terminal charging apparatus of claim 1, wherein, if the ratio (V2/V1) of the second voltage (V2) to the first voltage (V1) is less than the first set value between starting of conduction of the charging coil and completion of an authentication and configuration phase, the controller performs the safety operation.

3. The portable terminal charging apparatus of claim 1, wherein, if the ratio (V2/V1) of the second voltage (V2) to the first voltage (V1) is less than a second set value which is held in the memory and is smaller than the first set value, after the authentication and configuration phase is completed, the controller performs the safety operation.

4. The portable terminal charging apparatus of claim 1, further comprising:
    an alarm that is connected to the controller,
    wherein the controller causes the alarm to issue a warning as the safety operation before conduction of the charging coil is performed.

5. The portable terminal charging apparatus of claim 1,
    wherein the charging coil has a ring shape formed by winding a wiring material in a spiral shape, and
    wherein the first and second detection coils are disposed on a surface of the charging coil opposing the support plate.

6. The portable terminal charging apparatus of claim 1,
    wherein an outer diameter of the first detection coil is substantially the same as an outer diameter of the charging coil, and an outer diameter of the second detection coil is substantially the same as an inner diameter of the charging coil.

7. The portable terminal charging apparatus of claim 1,
    wherein a third detection coil disposed between the first and second detection coils is further provided in the charging coil.

8. The portable terminal charging apparatus of claim 1,
    wherein the controller blocks conduction of the charging coil as the safety operation.

9. The portable terminal charging apparatus of claim 1, further comprising:

a voltage detector that is connected to the controller and is also connected to the first and second detection coils so as to measure peak voltages of the first and second detection coils.

10. The portable terminal charging apparatus of claim 1, further comprising:
a driver that can move the charging coil on a rear surface side of the support plate,
wherein the charging coil is disposed to be movable in a state of opposing the support plate on the rear surface side of the support plate,
wherein a plurality of foreign substance detection coils are provided on the support plate in addition to the first and second detection coils,
wherein the controller is also connected to the driver and the plurality of foreign substance detection coils in addition to the charging coil and the first and second detection coils, and the memory stores a reference resonance frequency or a reference resonance voltage of each foreign substance detection coil for each location where the charging coil is present, and
wherein the controller also performs the safety operation before conduction of the charging coil is performed in a case where a resonance frequency detected by one of the plurality of foreign substance detection coils corresponding to a location where the charging coil is present is higher than the reference resonance frequency stored in the memory, or a resonance voltage detected by one of the plurality of foreign substance detection coils corresponding to a location where the charging coil is present is lower than the reference resonance voltage stored in the memory.

11. The portable terminal charging apparatus of claim 10, wherein, if the ratio (V2/V1) of the second voltage (V2) detected by the second detection coil to the first voltage (V1) detected by the first detection coil is less than the first set value stored in the memory between starting of conduction of the charging coil and completion of the authentication and configuration phase, the controller performs the safety operation.

12. The portable terminal charging apparatus of claim 10, wherein, if the ratio (V2/V1) of the second voltage (V2) to the first voltage (V1) is less than a second set value which is held in the memory and is smaller than the first set value after the authentication and configuration phase is completed, the controller performs the safety operation.

13. The portable terminal charging apparatus of claim 10, wherein the foreign substance detection coils are provided on the front and rear surfaces of the support plate.

14. The portable terminal charging apparatus of claim 10, further comprising:
an alarm that is connected to the controller,
wherein the controller causes the alarm to issue a warning as the safety operation.

15. The portable terminal charging apparatus of claim 10, wherein the charging coil has a ring shape formed by winding a wiring material in a spiral shape, and
wherein the first and second detection coils are disposed on a surface of the charging coil opposing the support plate.

16. The portable terminal charging apparatus of claim 10, wherein an outer diameter of the first detection coil is substantially the same as an outer diameter of the charging coil, and an outer diameter of the second detection coil is substantially the same as an inner diameter of the charging coil.

17. The portable terminal charging apparatus of claim 10, wherein a third detection coil disposed between the first and second detection coils is further provided in the charging coil.

18. The portable terminal charging apparatus of claim 10, wherein the controller blocks conduction of the charging coil as the safety operation.

19. The portable terminal charging apparatus of claim 10, further comprising:
a voltage detector that is connected to the controller and is also connected to the first and second detection coils so as to measure peak voltages of the first and second detection coils.

20. The portable terminal charging apparatus of claim 10, wherein the controller records a location where the charging coil is present, in the memory, after charging using the charging coil is performed.

21. An automobile comprising:
a vehicle interior; and
the portable terminal charging apparatus of claim 1, disposed in the vehicle interior so that the portable terminal placement portion faces upward.

* * * * *